(12) United States Patent
Lee et al.

(10) Patent No.: US 12,408,118 B2
(45) Date of Patent: Sep. 2, 2025

(54) ELECTRONIC DEVICE FOR TRANSMITTING RF SIGNAL AND OPERATION METHOD THEREOF

(71) Applicant: SAMSUNG ELECTRONICS CO., LTD., Suwon-si (KR)

(72) Inventors: Dongju Lee, Suwon-si (KR); Suho Jin, Suwon-si (KR); Jaeho Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 370 days.

(21) Appl. No.: 18/121,221

(22) Filed: Mar. 14, 2023

(65) Prior Publication Data

US 2023/0309023 A1  Sep. 28, 2023

Related U.S. Application Data

(63) Continuation of application No. PCT/KR2023/002599, filed on Feb. 23, 2023.

(30) Foreign Application Priority Data

Mar. 25, 2022 (KR) .......... 10-2022-0037493
Apr. 22, 2022 (KR) .......... 10-2022-0050183

(51) Int. Cl.
*H04W 52/24* (2009.01)
*H04W 52/32* (2009.01)
*H04W 52/36* (2009.01)

(52) U.S. Cl.
CPC ......... *H04W 52/241* (2013.01); *H04W 52/32* (2013.01); *H04W 52/367* (2013.01)

(58) Field of Classification Search
None
See application file for complete search history.

(56) References Cited

U.S. PATENT DOCUMENTS 8,818,305 B1  8/2014  Schwent et al.
10,278,143 B2  4/2019  Kam
(Continued)

FOREIGN PATENT DOCUMENTS

CN  109274441  1/2019
EP  2920877  1/2018
(Continued)

OTHER PUBLICATIONS

Search Report and Written Opinion dated May 15, 2023 issued in International Patent Application No. PCT/KR2023/002599.

*Primary Examiner* — Suhail Khan
(74) *Attorney, Agent, or Firm* — Nixon & Vanderhye, P.C.

(57) ABSTRACT

An electronic device may include at least one communication processor, an RFIC, at least one power amplifier, and at least one converter, the at least one communication processor is configured to identify at least one first driving voltage corresponding to at least one first transmission power of at least one first RF signal, control a first converter corresponding to a first power amplifier among the at least one converter, so that the at least one first driving voltage is applied to the first power amplifier corresponding to the at least one first RF signal among the at least one power amplifier, identify at least one second driving voltage corresponding to the at least one first transmission power of the at least one first RF signal, control the first converter so that the at least one second driving voltage is applied to the first power amplifier.

20 Claims, 20 Drawing Sheets

(56) References Cited

U.S. PATENT DOCUMENTS

| | | | |
|---|---|---|---|
| 2015/0235656 A1* | 8/2015 | Kim | ........................ G10L 15/28 |
| | | | 455/563 |
| 2016/0156316 A1 | 6/2016 | Drogi et al. | |
| 2018/0123516 A1 | 5/2018 | Kim et al. | |
| 2018/0159577 A1 | 6/2018 | Pehlke et al. | |
| 2018/0184388 A1 | 6/2018 | Kam | |
| 2020/0287577 A1 | 9/2020 | Hitomi et al. | |
| 2020/0336996 A1 | 10/2020 | Van et al. | |

FOREIGN PATENT DOCUMENTS

| | | |
|---|---|---|
| JP | 2016-512414 | 4/2016 |
| JP | 2018-160925 | 10/2018 |
| KR | 10-2006-0092754 | 8/2006 |
| KR | 10-2007-0052126 | 5/2007 |
| KR | 10-2018-0048076 | 5/2018 |
| KR | 10-2018-0075113 | 7/2018 |
| KR | 10-2020-0122887 | 10/2020 |
| WO | 2012/151594 | 11/2012 |

\* cited by examiner

ELECTRONIC DEVICE FOR TRANSMITTING RF SIGNAL AND OPERATION METHOD THEREOF

CROSS-REFERENCE TO RELATED APPLICATIONS

This application is a continuation of International Application No. PCT/KR2023/002599 designating the United States, filed on Feb. 23, 2023, in the Korean Intellectual Property Receiving Office and claiming priority to Korean Patent Application No. 10-2022-0037493, filed on Mar. 25, 2022, in the Korean Intellectual Property Office, and to Korean Patent Application No. 10-2022-0050183, filed on Apr. 22, 2022, in the Korean Intellectual Property Office, the disclosures of all of which are incorporated by reference herein in their entireties.

BACKGROUND

Field

The disclosure relates to an electronic device for transmitting a radio frequency (RF) signal and an operation method thereof.

Description of Related Art

An electronic device may transmit multiple types of RF signals. For example, a physical channel for an RF signal may include at least one of a physical uplink shared channel (PUSCH), a physical uplink control channel (PUCCH), a physical random-access channel (PRACH), and a sounding reference signal (SRS). An electronic device may transmit each of an RF signal of a PUSCH, an RF signal of a PUCCH, an RF signal of a PRACH, and an SRS using a resource allocated for each uplink channel.

Transmission power for each uplink physical channel may be configured differently. Accordingly, as RF signals corresponding to uplink physical channels are respectively transmitted, the transmission powers of the RF signals may be changed. An electronic device may include at least one power amplifier for amplifying an RF signal. A mode for controlling of a driving voltage Vcc applied to a power amplifier, based on transmission power of an RF signal, includes an envelope tracking (ET) mode and an average power tracking (APT) mode. In the APT mode, a driving voltage may be controlled based on transmission power of an RF signal, and the driving voltage may be controlled in units of time of slots (or subframes). In the ET mode, a driving voltage may be controlled by a tracking transmission power of an RF signal in real time. When an electronic device operates in an APT mode, a driving voltage Vcc determined according to the APT mode may be applied to a power amplifier. In a capacitor for the APT mode of the electronic device, charging and discharging may occur according to a change in the driving voltage Vcc. According to occurrence of charging and discharging in the capacitor for the APT mode, expansion and contraction of a dielectric inside the capacitor for the APT mode may occur. The expansion and contraction of the dielectric may cause generation of vibration. The generated vibration may be transferred to peripheral components. When a frequency of the corresponding vibration is included in an audible band (e.g., 20 to 20000 Hz), a user may hear the vibration as noise. For example, when the distance between a receiver and the capacitor is relatively short, there is a possibility that a user hears noise with a relatively high volume. In addition, when a change in voltage applied to the capacitor for the APT mode is relatively large, a relatively high volume of noise may be caused.

SUMMARY

Embodiments of the disclosure provide an electronic device and an operating method thereof that may determine a driving voltage using correlation information between a transmission power and a driving voltage different from those in a normal state when an audible noise-associated event occurs.

According to various embodiments, an electronic device may include at least one communication processor configured to output at least one baseband signal, a radio frequency integrated circuit (RFIC) configured to output at least one RF signal generated based on the at least one baseband signal, at least one power amplifier configured to amplify the at least one RF signal and output amplified at least one RF signal to at least one antenna, and at least one converter configured to provide a driving voltage for amplification of the at least one RF signal to the at least one power amplifier, wherein at least one capacitor is connected between the at least one converter and the at least one power amplifier. Based on no detection of an audible noise-associated event, the at least one communication processor is configured to, based on first association information between multiple driving voltages and multiple transmission powers of RF signals, identify at least one first driving voltage corresponding to at least one first transmission power of at least one first RF signal, wherein a minimum value of a driving voltage according to the first association information is a first voltage value, and the at least one communication processor is configured control a first converter corresponding to a first power amplifier among the at least one converter, so that the at least one first driving voltage is applied to the first power amplifier corresponding to the at least one first RF signal among the at least one power amplifier, wherein a peak-to-peak value of voltage applied to a first capacitor, which corresponds to the first power amplifier from among the at least one capacitor, while the at least one first driving voltage is being applied is a first value. Based on detection of the audible noise-associated event, the at least one communication processor is configured to, based on second association information between multiple driving voltages and multiple transmission powers of RF signals, identify at least one second driving voltage corresponding to the at least one first transmission power of the at least one first RF signal, wherein a minimum value of a driving voltage according to the second association information is a second voltage value greater than the first voltage value, and the at least one communication processor is further configured to control the first converter so that the at least one second driving voltage is applied to the first power amplifier, wherein a peak-to-peak value of voltage applied to the first capacitor while the at least one second driving voltage is being applied is a second value which less than the first value.

According to various embodiments, a method of operation an electronic device, including at least one communication processor configured to output at least one baseband signal, a radio frequency integrated circuit (RFIC) configured to output at least one RF signal generated based on the at least one baseband signal, at least one power amplifier configured to amplify the at least one RF signal and output amplified at least one RF signal to at least one antenna, and at least one converter configured to provide the at least one power amplifier with a driving voltage for amplification of the at least one RF signal, may, based on no detection of an audible noise-associated event, include, based on first association information between multiple driving voltages and multiple transmission powers of RF signals, identifying at least one first driving voltage corresponding to at least one first transmission power of at least one first RF signal, wherein a minimum value of a driving voltage according to the first association information is a first voltage value, and controlling a first converter corresponding to a first power amplifier among the at least one converter, so that the at least one first driving voltage is applied to the first power amplifier corresponding to the at least one first RF signal among the at least one power amplifier. The method of operating the electronic device may, based on detection of the audible noise-associated event, further include, based on second association information between multiple driving voltages and multiple transmission powers of RF signals, identifying at least one second driving voltage corresponding to the at least one first transmission power of the at least one first RF signal, wherein a minimum value of a driving voltage according to the second association information is a second voltage value greater than the first voltage value, and controlling the first converter so that the at least one second driving voltage is applied to the first power amplifier.

According to various embodiments, an electronic device may include at least one communication processor configured to output at least one baseband signal, a radio frequency integrated circuit (RFIC) configured to output at least one RF signal generated based on the at least one baseband signal, at least one power amplifier configured to amplify the at least one RF signal and output the amplified at least one RF signal to at least one antenna, and at least one converter configured to provide a driving voltage for amplifying the at least one RF signal to the at least one power amplifier, wherein at least one capacitor is connected between the at least one converter and the at least one power amplifier. Based on no detection of an audible noise-associated event, the at least one communication processor may be configured to, based on a transmission power of a first RF signal being a first transmission power, control a first converter corresponding to a first power amplifier among the at least one converter, so that a first driving voltage is applied to the first power amplifier corresponding to the first RF signal among the at least one power amplifier, and the at least one communication processor may be configured to, based on the transmission power of the first RF signal being a second transmission power less than the first transmission power, control the first converter so that a second driving voltage smaller than the first driving voltage is applied to the first power amplifier. Based on detection of the audible noise-associated event, the at least one communication processor may be configured to, based on the transmission power of the first RF signal being the first transmission power, control the first converter so that a first driving voltage is applied to the first power amplifier, and the at least one communication processor may be further configured to, based on the transmission power of the first RF signal being the second transmission power, control the first converter so that a third driving voltage, less than the first driving voltage and greater than the second driving voltage, is applied to the first power amplifier. A first voltage difference between a first voltage value, applied to a first capacitor corresponding to the first converter from among the at least one capacitor while the first driving voltage being applied to the first power amplifier, and a second voltage value, applied to the first capacitor while the second driving voltage is being applied to the first power amplifier, may be greater than a second voltage difference between the first voltage value and a third voltage value which is applied to the first capacitor while the third driving voltage is being applied to the first power amplifier.

According to various embodiments, an electronic device may include at least one communication processor configured to output at least one baseband signal, a radio frequency integrated circuit (RFIC) configured to output at least one RF signal generated based on the at least one baseband signal, at least one power amplifier configured to amplify the at least one RF signal and output amplified at least one RF signal to at least one antenna, and at least one converter configured to provide a driving voltage for amplifying of the at least one RF signal to the at least one power amplifier. The at least one communication processor may be configured to, based on no detection of an audible noise-associated event, configure a maximum transmission power level corresponding to a first RF signal to be a first value, and control a first converter corresponding to a first power amplifier among the at least one power amplifier, so that a first driving voltage identified based on the first value is applied to the first power amplifier corresponding to the first RF signal among the at least one power amplifier. The at least one communication processor may be further configured to, based on detection of the audible noise-associated event, configure a maximum transmission power level corresponding to the first RF signal to be a second value less than the first value, and control the first converter so that a second driving voltage identified based on the second value is applied to the first power amplifier. In this case, the second driving voltage may be less than the first driving voltage.

According to various embodiments, an electronic device and an operation method thereof can be provided, the device and method capable of determining a driving voltage using association information between a transmission power and a driving voltage which are different from those in a normal state when an audible noise-associated event is generated. Accordingly, the magnitude of a change (or peak-to-peak) in voltage applied to a capacitor is reduced, and generation of audible noise can be suppressed.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
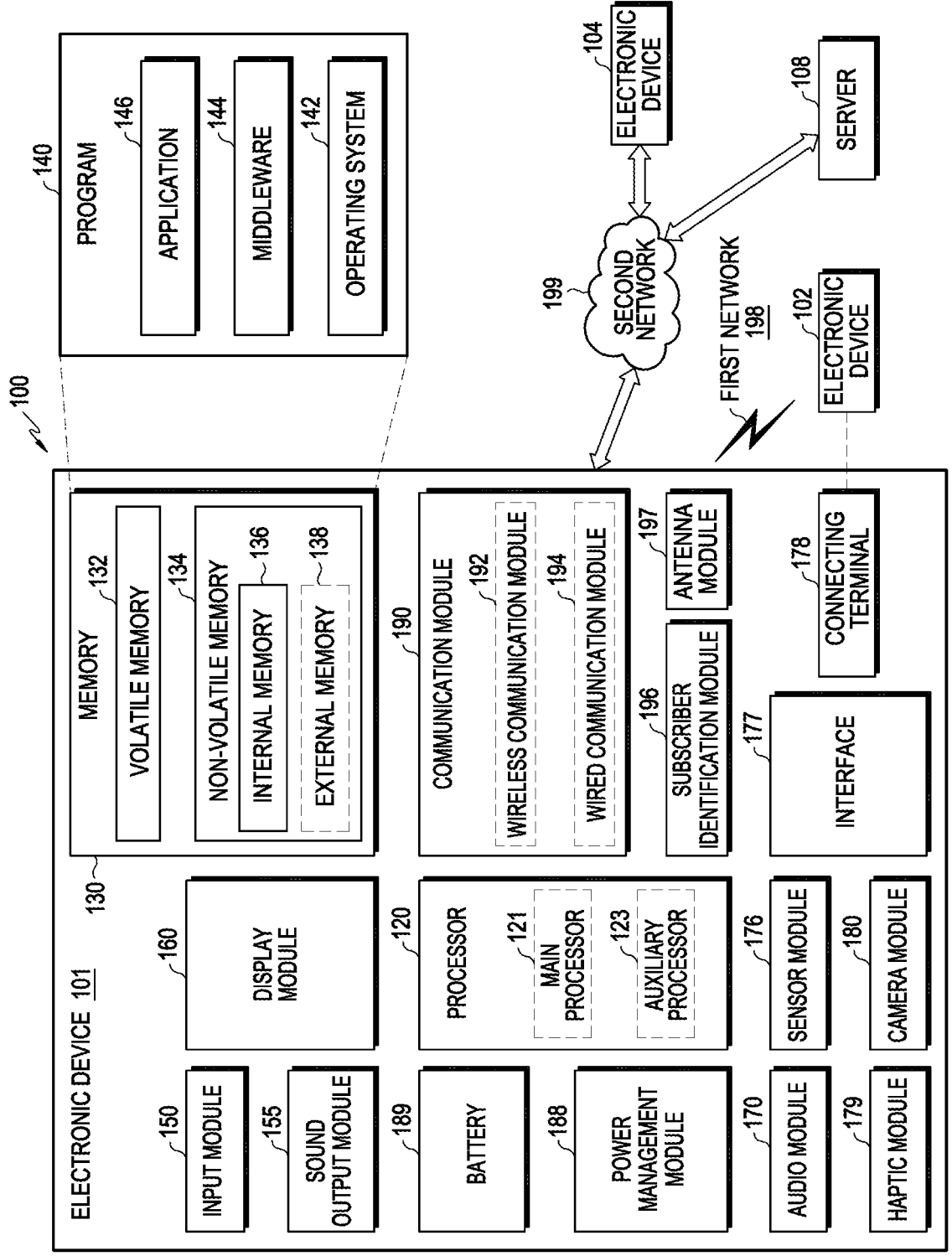
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
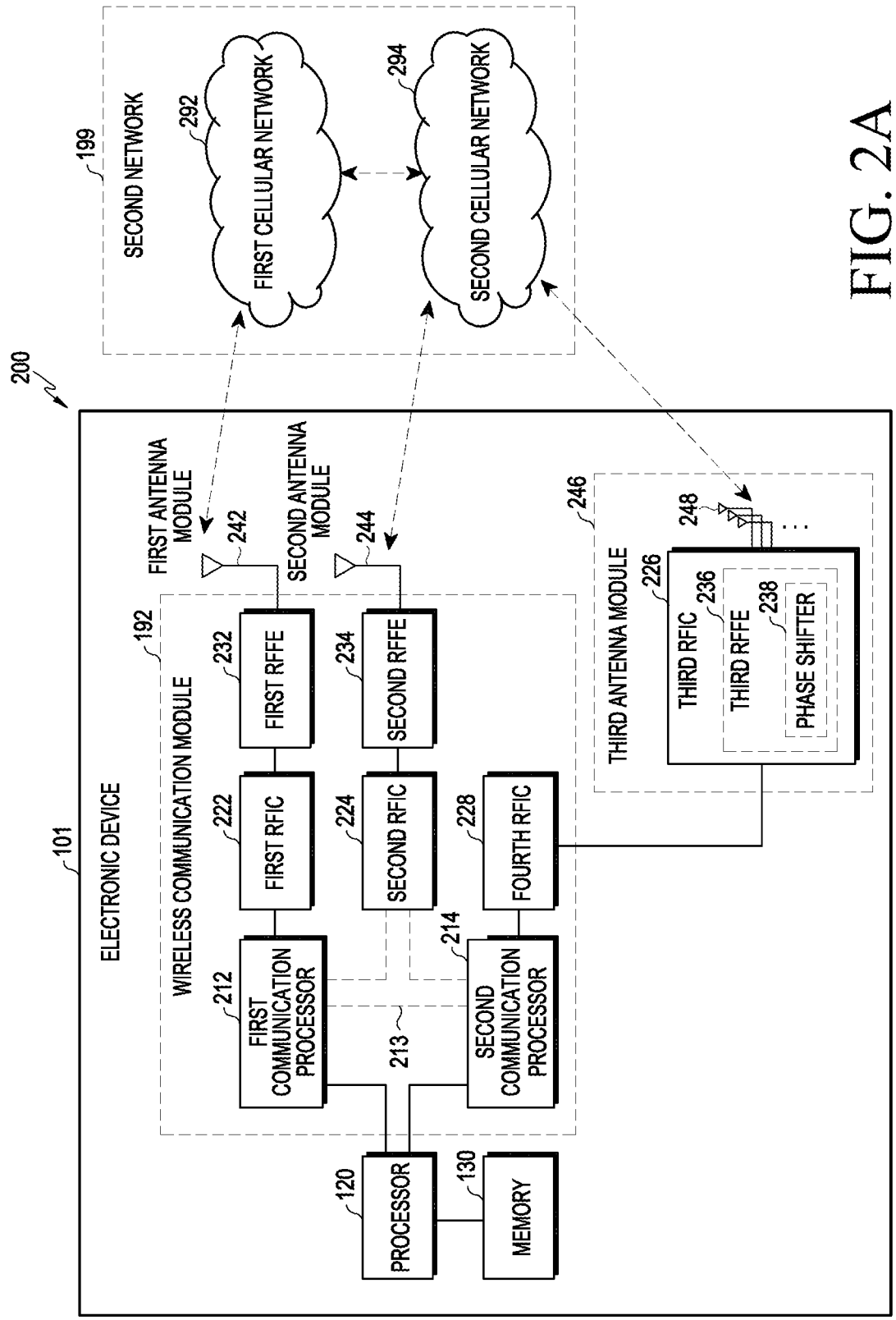
FIG. 2A is a block diagram of the electronic device to support legacy network communication and 5G network communication, according to various embodiments.

FIG. 2A is a block diagram 200 of the electronic device 101 to support legacy network communication and 5G network communication, according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module (e.g., including at least one antenna) 242, a second antenna module (e.g., including at least one antenna) 244, a third antenna module (e.g., including at least one antenna) 246, and antennas 248. The electronic device 101 may further include a processor (e.g., including processing circuitry) 120 and a memory 130. The second network 199 may include a first cellular network 292 and a second cellular network 294. According to an embodiment, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to an embodiment, the fourth RFIC 228 may be omitted or may be included as a part of the third RFIC 226.

The first communication processor 212 may include various processing circuitry and support establishment of a communication channel of a band to be used for wireless communication with the first cellular network 292, and legacy network communication via the established communication channel. According to various embodiments, the first cellular network may be a legacy network including a second generation (2G), 3G, 4G, or long-term evolution (LTE) network. The second communication processor 214 may include various processing circuitry and support establishment of a communication channel corresponding to a designated band (e.g., about 6 GHz to about 60 GHz) among bands to be used for wireless communication with the second cellular network 294, and 5G network communication via the established communication channel. According to various embodiments, the second cellular network 294 may be a 5G network defined by 3GPP. In addition, according to an embodiment, the first communication processor 212 or the second communication processor 214 may support establishment of a communication channel corresponding to another designated band (e.g., about 6 GHz or lower) among the bands to be used for wireless communication with the second cellular network 294, and 5G network communication via the established communication channel.

The first communication processor 212 may transmit data to or receive data from the second communication processor 214. For example, data that has been classified to be transmitted over the second cellular network 294 may be changed to be transmitted over the first cellular network 292. In this case, the first communication processor 212 may receive transmission data from the second communication processor 214. For example, the first communication processor 212 may transmit data or receive data from the second communication processor 214 via an inter-processor interface 213. The inter-processor interface 213 may be implemented as, for example, a universal asynchronous receiver/transmitter (UART) (e.g., high speed (HS)-UART) or a peripheral component interconnect bus express (PCIe) interface, but the type thereof is not limited. Alternatively, the first communication processor 212 and the second communication processor 214 may exchange control information and packet data information using, for example, a shared memory. The first communication processor 212 may transmit or receive various information to or from the second communication processor 214, the various information including sensing information, information on output strength, and resource block (RB) allocation information.

Depending on implementation, the first communication processor 212 may not be directly connected to the second communication processor 214. In this case, the first communication processor 212 may transmit data to or receive data from the second communication processor 214 via the processor 120 (e.g., an application processor including various processing circuitry). For example, the first communication processor 212 and the second communication processor 214 may transmit or receive data via the processor 120 (e.g., an application processor) and an HS-UART interface or a PCIe interface, but the type of the interface is not limited. Alternatively, the first communication processor 212 and the second communication processor 214 may exchange control information and packet data information using the processor 120 (e.g., an application processor) and the shared memory.

Figure 2B:
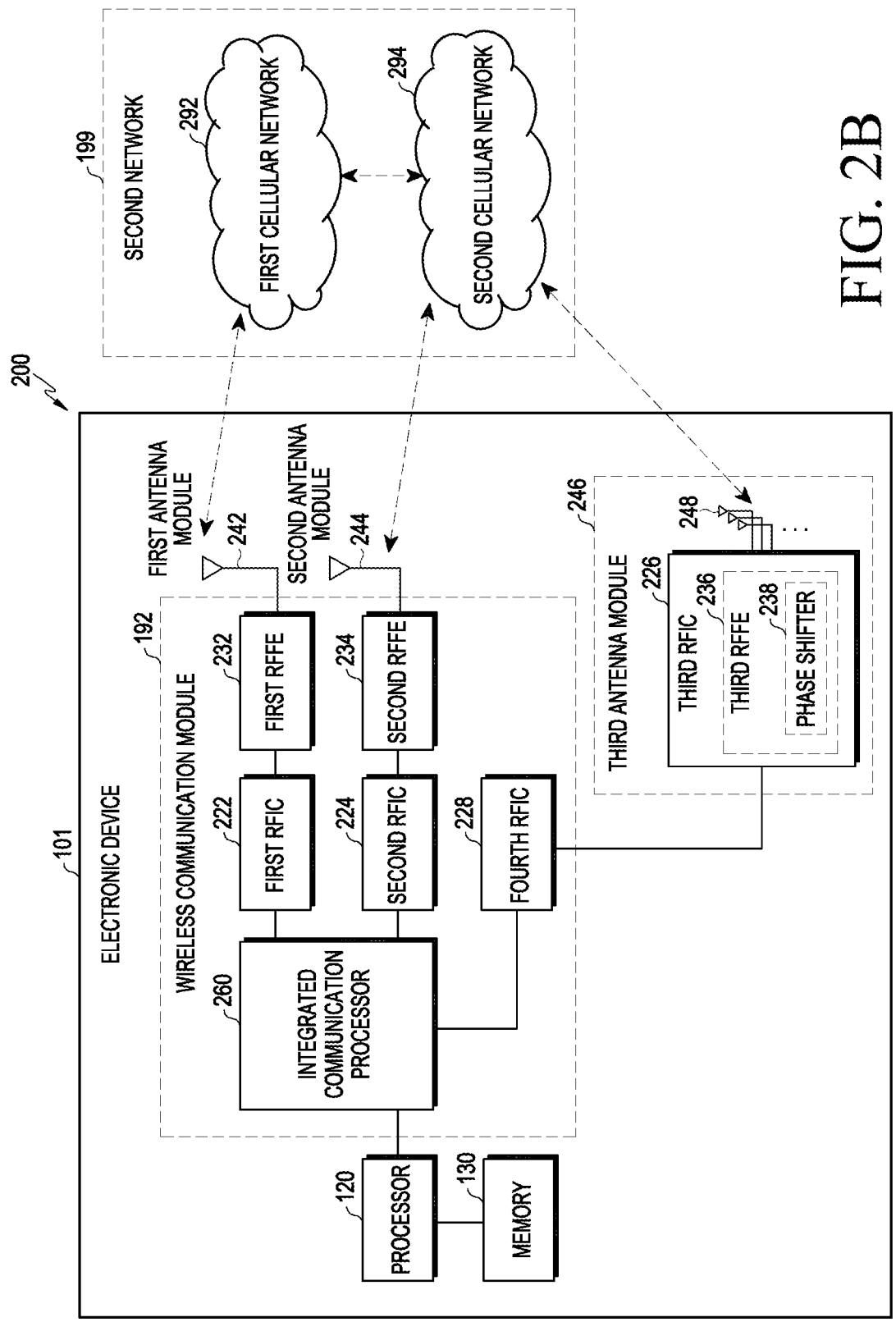
FIG. 2B is a block diagram of the electronic device to support legacy network communication and 5G network communication according to various embodiments.

According to an embodiment, the first communication processor 212 and the second communication processor 214 may be implemented in a single chip or a single package. According to various embodiments, the first communication processor 212 or the second communication processor 214 may be implemented, in a single chip or a single package, together with the processor 120, the auxiliary processor 123, or the communication module 190. For example, as shown in FIG. 2B, an integrated communication processor 260 may support functions for communication with both the first cellular network 292 and the second cellular network 294.

The first RFIC 222 may convert, during transmission, a baseband signal generated by the first communication processor 212 into a radio frequency (RF) signal of about 700 MHz to about 3 GHz used for the first cellular network 292 (e.g., a legacy network). During reception, the RF signal may be acquired from the first cellular network 292 (e.g., legacy network) through an antenna (e.g., first antenna module 242) and may be preprocessed via RFFE (e.g., first RFFE 232). The first RFIC 222 may convert the preprocessed RF signal into a baseband signal so as to be processed by the first communication processor 212.

The second RFIC 224 may convert, during transmission, a baseband signal generated by the first communication processor 212 or the second communication processor 214 into an RF signal (hereinafter, a 5G Sub6 RF signal) of a Sub6 band (e.g., about 6 GHz or lower) used for the second cellular network 294 (e.g., a 5G network). During reception, the 5G Sub6 RF signal may be acquired from the second cellular network 294 (e.g., a 5G network) through an antenna (e.g., the second antenna module 244) and may be preprocessed via RFFE (e.g., the second RFFE 234). The second RFIC 224 may convert the preprocessed 5G Sub6 RF signal into a baseband signal so as to be processed by a communication processor corresponding to one of the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., about 6 GHz to about 60 GHz) to be used in the second cellular network 294 (e.g., a 5G network). During reception, the 5G Above6 RF signal may be acquired from the second cellular network 294 (e.g., a 5G network) through an antenna (e.g., the antenna 248) and may be preprocessed via the third RFFE 236. The third RFIC 226 may convert the preprocessed 5G Above6 RF signal into a baseband signal so as to be processed by the second communication processor 214. According to an embodiment, the third RFFE 236 may be formed as a part of the third RFIC 226.

According to an embodiment, the electronic device 101 may include the fourth RFIC 228 separately from or as at least a part of the third RFIC 226. In this case, the fourth RFIC 228 may convert a baseband signal generated by the second communication processor 214 into an RF signal (hereinafter, an IF signal) of an intermediate frequency band (e.g., about 9 GHz to about 11 GHz), and then may transfer the IF signal to the third RFIC 226. The third RFIC 226 may convert the IF signal into a 5G Above6 RF signal. During reception, the 5G Above6 RF signal may be received from the second cellular network 294 (e.g., a 5G network) through an antenna (e.g., the antenna 248) and may be converted into an IF signal by the third RFIC 226. The fourth RFIC 228 may convert the IF signal into a baseband signal so as to be processed by the second communication processor 214.

According to an embodiment, the first RFIC 222 and the second RFIC 224 may be implemented as at least a part of a single package or a single chip. According to various embodiments, in FIG. 2A or FIG. 2B, when implemented as a single chip or a single package, the first RFIC 222 and the second RFIC 224 may be implemented as an integrated RFIC. In this case, the integrated RFIC may be connected to the first RFFE 232 and the second RFFE 234 so as to convert a baseband signal into a signal of a band supported by the first RFFE 232 and/or the second RFFE 234, and the converted signal may be transmitted to one of the first RFFE 232 and the second RFFE 234. According to an embodiment, the first RFFE 232 and the second RFFE 234 may be implemented as at least a part of a single package or a single chip. According to an embodiment, at least one of the first antenna module 242 or the second antenna module 244 may be omitted, or may be combined with another antenna module so as to process RF signals in multiple corresponding bands.

According to an embodiment, the third RFIC 226 and the antenna 248 may be disposed on the same substrate so as to form a third antenna module 246. For example, the wireless communication module 192 or the processor 120 may be disposed on a first substrate (e.g., a main PCB). In this case, the third RFIC 226 may be disposed in a partial area (e.g., bottom surface) of a second substrate (e.g., a sub-PCB) separate from the first substrate, and the antenna 248 may be disposed in another partial area (e.g., top surface), thereby forming the third antenna module 246. By placing the third RFIC 226 and the antenna 248 on the same substrate, it is possible to reduce the length of a transmission line therebetween. This, for example, may reduce the loss (e.g., attenuation), which is caused due to a transmission line, of a signal in a high frequency band (e.g., about 6 GHz to about 60 GHz) used for 5G network communication. Accordingly, the electronic device 101 may improve the quality or speed of communication with the second cellular network 294 (e.g., 5G network).

According to an embodiment, the antenna 248 may be formed as an antenna array including multiple antenna elements that may be used for beamforming. In this case, the third RFIC 226 may include, for example, multiple phase shifters 238 corresponding to the multiple antenna elements, as parts of the third RFFE 236. During transmission, each of the multiple phase shifters 238 may convert the phase of a 5G Above6 RF signal to be transmitted to the outside of the electronic device 101 (e.g., base station of a 5G network) via a corresponding antenna element. During reception, each of the multiple phase shifters 238 may convert the phase of the 5G Above6 RF signal received from the outside via the corresponding antenna element, into the same or substantially the same phase. This enables transmission or reception via beamforming between the electronic device 101 and the outside.

The second cellular network 294 (e.g., 5G network) may be operated independently of (e.g., stand-alone (SA) or in connection with (e.g., non-stand-alone (NSA)) the first cellular network 292 (e.g., legacy network). For example, the 5G network may have only an access network (e.g., a 5G radio access network (RAN) or a next generation RAN (NG RAN)) and may not have a core network (e.g., a next generation core (NGC)). In this case, the electronic device 101 may access the access network of the 5G network, and then may access an external network (e.g., Internet) under the control of a core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130 and may be accessed by other components (e.g., the processor 120, the first communication processor 212, or the second communication processor 214).

Figure 3A:
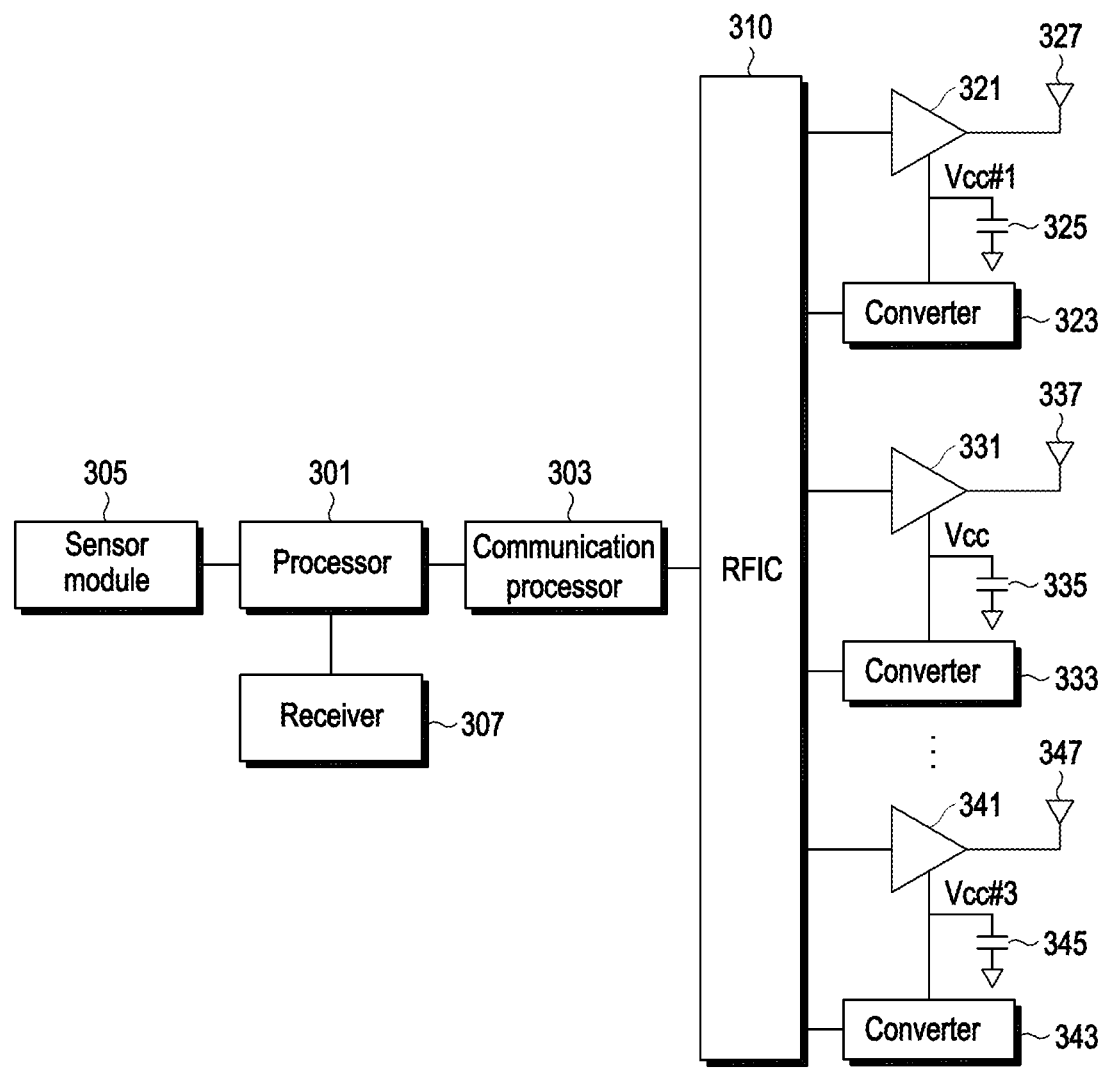
FIG. 3A is a block diagram of the electronic device including a power amplifier according to various embodiments.
Figure 3B:
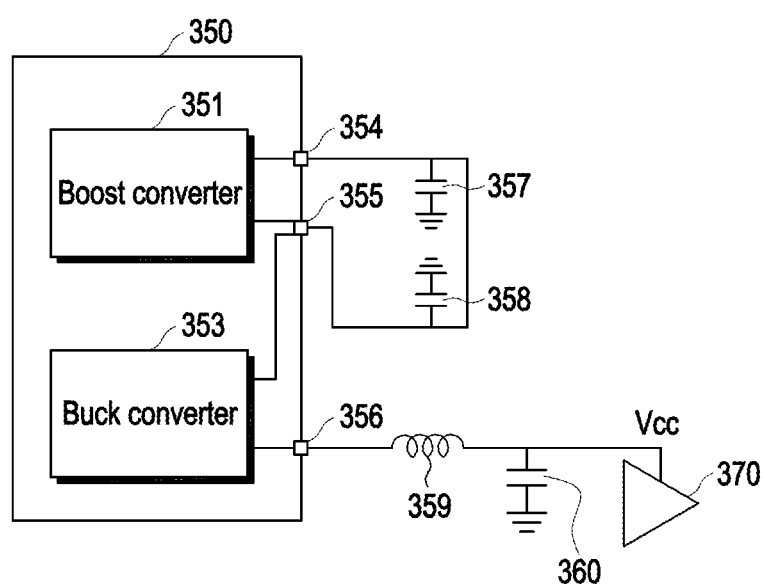
FIG. 3B is a diagram for illustrating a connection between a converter and a power amplifier according to various embodiments.

FIG. 3A is a block diagram of the electronic device including a power amplifier according to various embodiments. The embodiment of FIG. 3A will be described with reference to FIG. 3B. FIG. 3B is a diagram for illustrating a connection between a converter and a power amplifier according to various embodiments.

According to various embodiments, the electronic device 101 may include at least one of a processor (e.g., including processing circuitry) 301, a communication processor (e.g., including processing circuitry) 303, a sensor module (e.g., including at least one sensor) 305, a receiver (e.g., including receiving circuitry) 307, an RFIC 310, at least one power amplifier 321, 331, and 341, at least one converter (e.g., including circuitry) 323, 333, and 343, at least one capacitor 325, 335, and 345, or at least one antenna 327, 337, and 347.

According to various embodiments, the processor 301 (e.g., the processor 120) may include various processing circuitry and identify whether an audible noise-associated event is detected, based on whether a phone service-related application is executed, sensing data from the sensor module 305 (e.g., the sensor module 176), and/or whether the receiver 307 operates. In an example, when the receiver 307 operates, it may be determined that the event has been detected. In an example, when sensing data from the sensor module 305 (e.g., a proximity sensor) disposed corresponding to a position of the receiver 307 indicates "proximity", it may be determined that the event has been detected. In an example, when the phone service-related application (e.g., a phone application, an application supporting transmission/reception of a voice packet (or a packet for a video call), or a voice output application) is executed, it may be determined that the event has been detected. In an example, when a VoIP service (e.g., VoLTE, VoNR, and VoWiFi) is performed, it may be determined that the event has been detected. The processor 301 may identify whether the event is detected, based on the above-described various examples or a combination of at least two or more thereof, and the type thereof is not limited. When an audible noise-associated event is detected, the processor 301 may provide the communication processor 303 with an indication indicating that the audible noise-associated event is detected. Based on whether the indication is provided, the communication processor 303 may identify whether the audible noise-associated event has occurred. This is merely a non-limiting example, and in an embodiment, the communication processor 303 may directly determine whether the audible noise-associated event has occurred. For example, the communication processor 303 may acquire, directly or via the processor 301, sensing data of the sensor module 305 and/or information related to whether the receiver 307 operates, and may determine, based on the acquired information, whether the event has occurred. The receiver 307 may convert an input electrical signal into voice and output the same. In an embodiment, the communication processor 303 may determine whether the event has occurred, based on a determination result from the processor 301 and at least some of sensing data of the sensing module 305 and/or information associated with whether the receiver 307 operates, and it will be understood by those skilled in the art that there is no limitation on a subject that determines whether the event is detected.

According to various embodiments, the communication processor 303 (e.g., at least one of the first communication processor 212, the second communication processor 214, or the integrated communication processor 260) may provide the RFIC 310 (e.g., at least one of the first RFIC 222, the second RFIC 224, the third RFIC 226, or the fourth RFIC 228) with a baseband signal for transmission. The communication processor 303 may receive and process a baseband signal for reception from the RFIC 310. The communication processor 303 may control, for example, the RFIC 310, and/or the at least one power amplifier 321, 331, and 341 (or RFFE), and the at least one converter 323, 333, and 343 (or modulator). The at least one power amplifier 321, 331, and 341 (or RFFE) may be implemented to be controlled by, for example, the RFIC 310. The communication processor 303 may process an antenna switching code and/or a tuning code. The communication processor 303 may determine whether an audible noise-associated event is detected, based on an indication from the processor 120 (or based on an information acquired by the communication processor 303 itself). When it is determined that the audible noise-associated event has occurred, the communication processor 303 may perform at least one operation for reducing audible noise, which will be described later.

According to various embodiments, the RFIC 310 may generate, for example, an RF signal corresponding to a baseband signal for transmission, and may provide the same to at least some of the at least one power amplifier 321, 331, and 341. FIG. 3A illustrates that a baseband signal for transmission is provided to the at least one power amplifier 321, 331, and 341 through a single line, but this is merely a non-limiting example, and it will be understood by those skilled in the art that baseband signals of an in-phase (I) component and a quadrature (Q) component may be provided to the at least one power amplifier 321, 331, and 341. The at least one power amplifier 321, 331, and 341 may be included in an RFFE (e.g., at least one of the first RFFE 232, the second RFFE 234, or the third RFFE 236). The RFFE may be implemented as a power amplifier module (PAM), a front end module (FEM), a power amplifier module including duplexer (PAMiD), an LNA and PAM with integrated duplexer or diplexer (LPAMID), and a PA with integrated low noise amplifier and filter (LPAMIF) or as some thereof, and an implementation form thereof is not limited. FIG. 3A illustrates that at least one power amplifier 321, 331, and 341 is connected to the RFIC 310, but it will be understood by those skilled in the art that, in addition to at least one power amplifier 321, 331, and 341, implementation may be performed so that a filter and/or an antenna switching module (ASM) are further included in the RFFE. Each of at least one power amplifier 321, 331, and 341 may amplify and output a received RF signal. Each of at least one power amplifier 321, 331, and 341 may be classified for each processable frequency band. For example, the power amplifier 321 may be configured to amplify an RF signal having a frequency included in a low band, the power amplifier 331 may be configured to amplify an RF signal having a frequency included in a mid band and/or a high band, and the power amplifier 341 may be configured to amplify an RF signal having a frequency included in an ultra-high band, but this has no limitation, and there is no limitation on the number of power amplifiers, either.

According to various embodiments, the at least one converter 323, 333, and 343 may include various circuitry and provide a driving voltage Vcc to at least one power amplifier 321, 331, and 341 using a supplied power. At least one power amplifier 321, 331, and 341 may amplify the RF signal provided from the RFIC 310 using each of at least one driving voltage Vcc #1, Vcc #2, and Vcc #3. The converter 350 may be configured to operate according to an APT mode, for example. Alternatively, the converter 350 may operate in a direct mode or in an ET mode. When operating in the ET mode, the converter 350 may be replaced with a linear amplifier. The at least one capacitor 325, 335, and 345 may be connected to the at least one converter 323, 333, and 343, respectively. The at least one capacitor 325, 335, and 345 may be charged or discharged, for example, for the purpose of supplying driving voltages to the power amplifiers 321, 331, and 341 relatively quickly. For example, referring to FIG. 3B, the converter 350 (e.g., one of the at least one converter 323, 333, and 343) may include a boost converter 351 and/or a buck converter 353. The boost converter 351 may increase voltage input from a power management integrated circuit (PMIC) (not shown), and the buck converter 353 may decrease input voltage. The boost converter 351 and/or the buck converter 353 may be connected to at least some of capacitors 357, 358, and 360 via, for example, nodes (or ports) 354, 355, and 356. An inductor 359 may be connected between a power amplifier 370 (e.g., one of the at least one power amplifier 321, 331, and 341) and the converter 350. The boost converter 351 and/or the buck converter 353 may provide the driving voltage Vcc to the power amplifier 370. The driving voltage Vcc (or voltage substantially equal to the driving voltage Vcc, or voltage having a magnitude proportional to the driving voltage Vcc) may be applied to the capacitor 360. For convenience of description, in the disclosure, it may be expressed that the driving voltage Vcc is applied to the capacitor 360.

Again, referring to FIG. 3A, at least one driving voltage may be applied to the at least one capacitor 325, 335, and 345, respectively. For example, when driving voltage Vcc #1 is applied to the capacitor 325, the magnitude of driving voltage Vcc #1 may be changed over time. For example, a transmission power of an RF signal provided to the antenna 327 may be changed over time, and accordingly, driving voltage Vcc #1 applied to the power amplifier 321 for amplifying the RF signal may also be changed based on the APT mode. The change of driving voltage Vcc #1 applied to the power amplifier 321 over time may cause a change of the physical shape of the corresponding capacitor 325. A change of a driving voltage and a change of the physical shape of a capacitor will be described with reference to FIG. 5A and FIG. 5B.

Figure 4A:
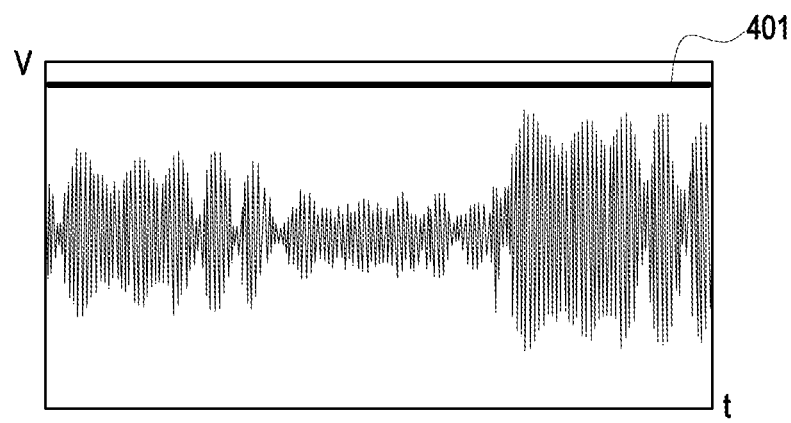
FIG. 4A, FIG. 4B and FIG. 4C are diagrams for illustrating an operation mode of a modulator according to various embodiments.
Figure 4B:
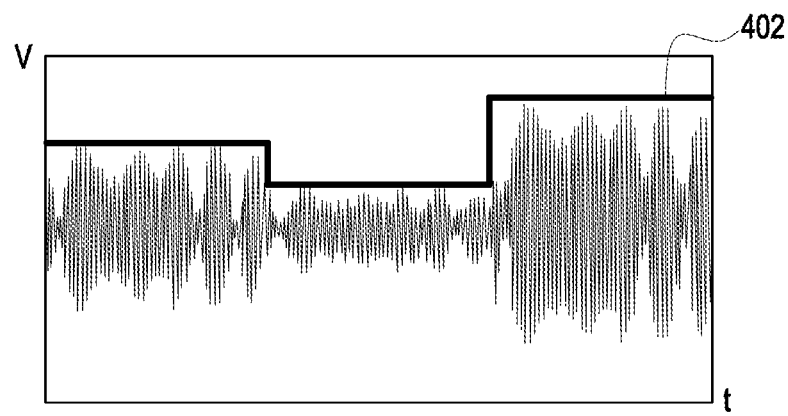
Figure 4C:
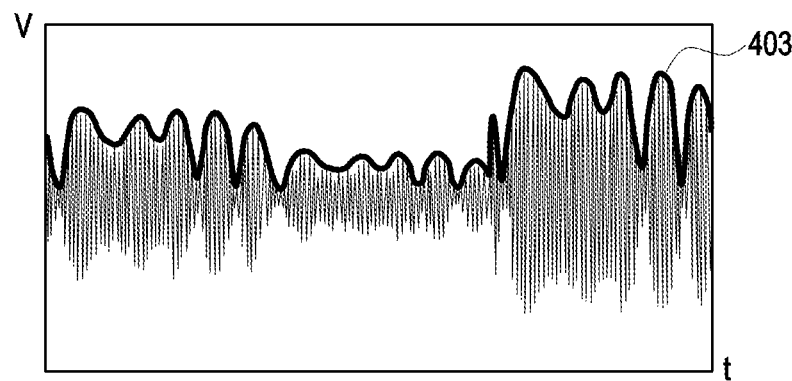

FIG. 4A, FIG. 4B and FIG. 4C are diagrams for illustrating an operation mode of a modulator according to various embodiments.

In an example, when operating according to the direct mode, as in FIG. 4A, for example, driving voltage Vcc #1 401 of the power amplifier 321 may be configured to a designated value. In the direct mode, the driving voltage 401 of the designated value may be provided to the power amplifier 321 irrespective of the magnitude of a transmission power for each signal. In this case, wasted power consumption may be relatively large. In another example, when operating according to the APT mode, as in FIG. 4B, driving voltage Vcc #1 402 of the power amplifier 321 may be configured (or changed) to a designated time unit (e.g., a slot (or subframe)) (or may be referred to as a transition time interval (TTI)). For example, in a subframe (or slot) in which the transmission power of the RF signal is configured to 10 to 18 dBm, driving voltage Vcc #1 of 3V may be supplied to the power amplifier 321, and in a subframe (or slot) in which the transmission power of the RF signal is configured to 18 to 24 dBm, driving voltage Vcc #1 of 4V may be supplied to the power amplifier 321. In another example, when operating according to the ET mode, as in FIG. 4C, driving voltage Vcc #1 403 of the power amplifier 321 may be configured (or changed) in real time according to the magnitude of the transmission power of the RF signal. When operating in the ET mode, the converter 323 may track the transmission power of the RF signal in real time and provide a driving voltage corresponding to an envelope of the transmission power to the power amplifier 321. A time interval for configuring (or changing) of driving voltage Vcc #1 in the ET mode may be shorter than a time interval for configuring (or changing) of driving voltage Vcc #1 in the APT mode. The communication processor 303 (or modulator) may determine the magnitude of the driving voltage configured in the APT mode or the ET mode using, for example, a value ($\sqrt{I^2+Q^2}$) based on an I/Q signal of a baseband signal, but the disclosure is not limited thereto. Although not shown, the electronic device 101 may include at least one of an envelope detector, an envelope shaper, and an amplifier, but the disclosure is not limited thereto.

Figure 5A:
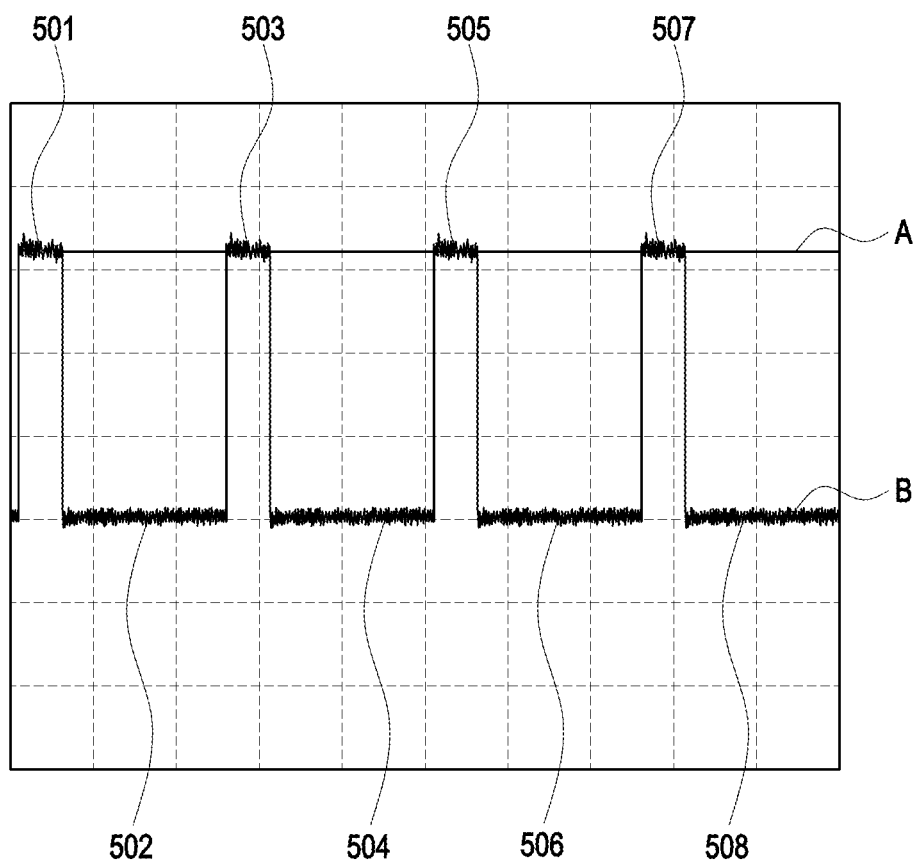
FIG. 5A illustrates a graph of voltage applied to a capacitor connected to a power amplifier according to various embodiments.
Figure 5B:
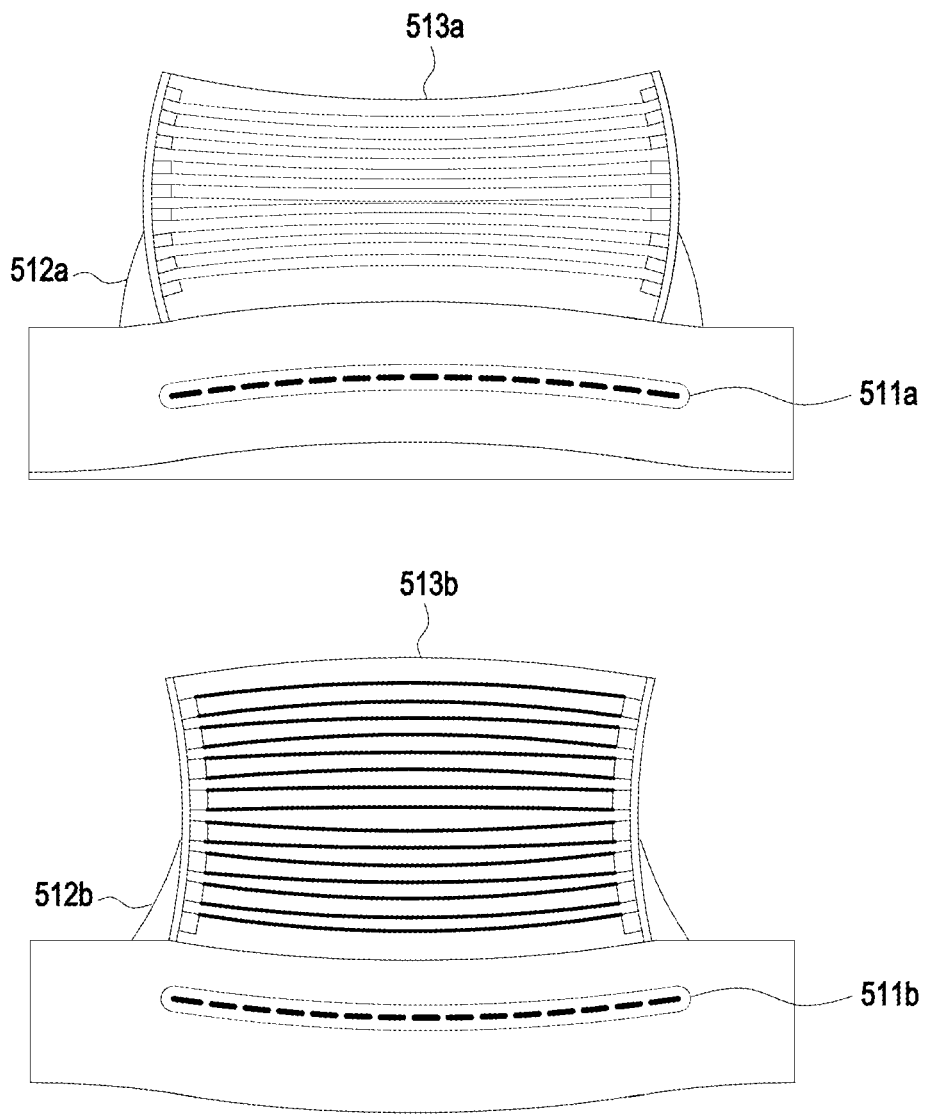
FIG. 5B illustrates a cross-sectional diagram when charging and discharging of a capacitor according to various embodiments.
Figure 5C:
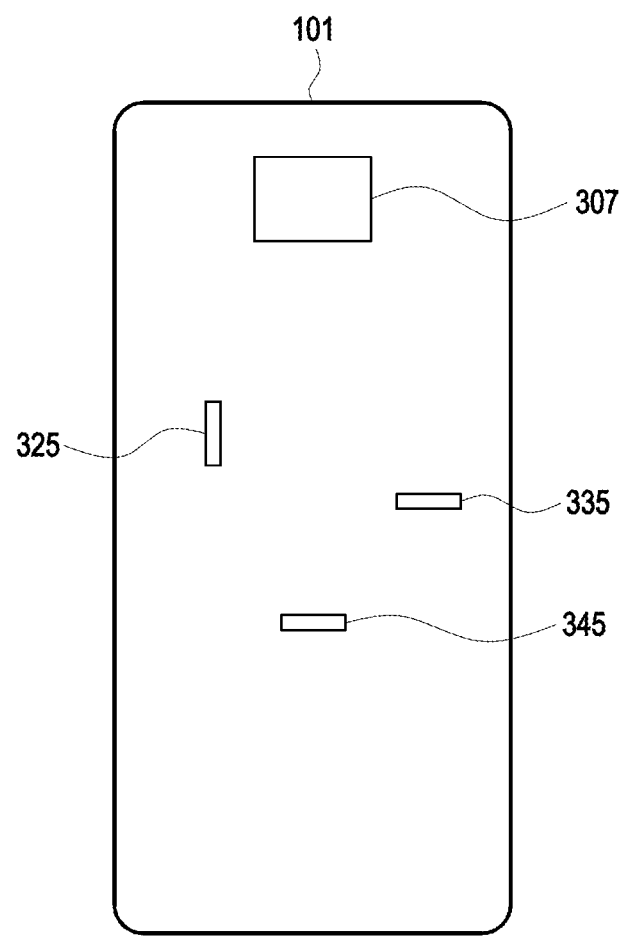
FIG. 5C is a diagram for illustrating positions of a receiver and a capacitor according to various embodiments.

FIG. 5A illustrates a graph of voltage applied to a capacitor connected to a power amplifier according to various embodiments. The embodiment of FIG. 5A will be described with reference to FIG. 5B and FIG. 5C. FIG. 5B illustrates a cross-sectional diagram when charging and discharging of a capacitor according to various embodiments. FIG. 5C is a diagram for illustrating positions of a receiver and a capacitor according to various embodiments.

According to various embodiments, driving voltage Vcc #1 of a power amplifier (e.g., the power amplifier 321 of FIG. 3A) for amplifying an RF signal as described above may be applied to a capacitor (e.g., the capacitor 325 of FIG. 3A). As in FIG. 5A, driving voltage Vcc #1 501, 502, 503, 504, 505, 506, 507, or 508 may be changed over time. For example, at least one part 501, 503, 505, and 507 of driving voltage Vcc #1 may have a first magnitude (A), and at least one part 502, 504, 506, and 508 of driving voltage Vcc #1 may have a second magnitude (B). For example, a difference between the first magnitude (A) and the second magnitude (B) may be generated based on a difference (e.g., a difference of a transmission power for each physical channel) of a transmission power of an RF signal, or may be generated based on transmission and non-transmission of an RF signal. A difference (e.g., the difference between the first magnitude (A) and the second magnitude (B)) of driving voltage Vcc #1 may cause charging and discharging of a capacitor, and thus audible noise may be generated. For example, referring to FIG. 5B, as described above, a capacitor (e.g., the capacitor 325 of FIG. 3A) may have a first shape 513a during discharging, and the capacitor (e.g., the capacitor 325 of FIG. 3A) may have a second shape 513b during charging. A change in the shape of the capacitor (e.g., the capacitor 325 of FIG. 3A) according to charging and discharging may cause a change in the shape of surrounding hardware, for example, a PCB or solder. For example, if the capacitor (e.g., the capacitor 325 of FIG. 3A) has the first shape 513a, the PCB may have a first shape 511a, and the solder may have a first shape 512a. For example, if the capacitor (e.g., the capacitor 325 of FIG. 3A) has the second shape 513b, the PCB may have a second shape 511b, and the solder may have a second shape 512b. Vibration may occur according to such a shape change, and if a frequency of the vibration is included in an audible band (20 to 20000 Hz), audible noise may be heard by a user. Referring to FIG. 5C, the receiver 307 and the capacitors 325, 335, and 345 may be, for example, disposed on the same PCB, in which case, vibration due to at least some of the capacitors 325, 335, and 345 may cause noise in the receiver 307. If two or more RF signals are transmitted based on a 2TX mode, which is based on multiple RATs, based on dual connectivity, vibration of multiple capacitors may occur. For example, as the number of hardware elements included in the electronic device 101 increases, the electronic device 101 may have multiple stacked PCBs, and hardware elements for RF signal processing may be disposed on the top PCB. Accordingly, there is a relatively high possibility that noise is generated in the receiver 307 due to vibration by at least some of the capacitors 325, 335, and 345. In particular, as a difference (e.g., the difference between the first magnitude (A) and the second magnitude (B) in FIG. 5A) between temporally adjacent voltages applied to a capacitor increases, a difference in the shape of the capacitor may become greater, which may cause greater noise.

Figure 6A:
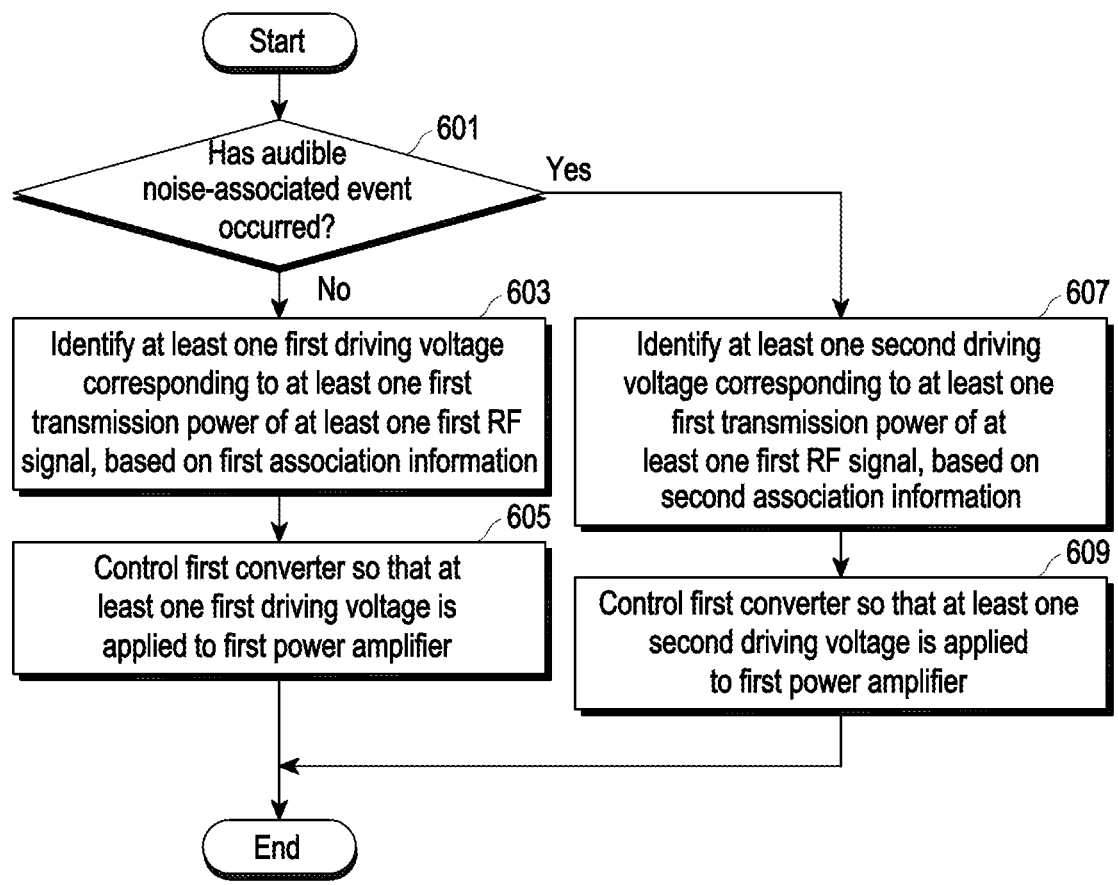
FIG. 6A is a flowchart for illustrating an operation method of an electronic device according to various embodiments.
Figure 6B:
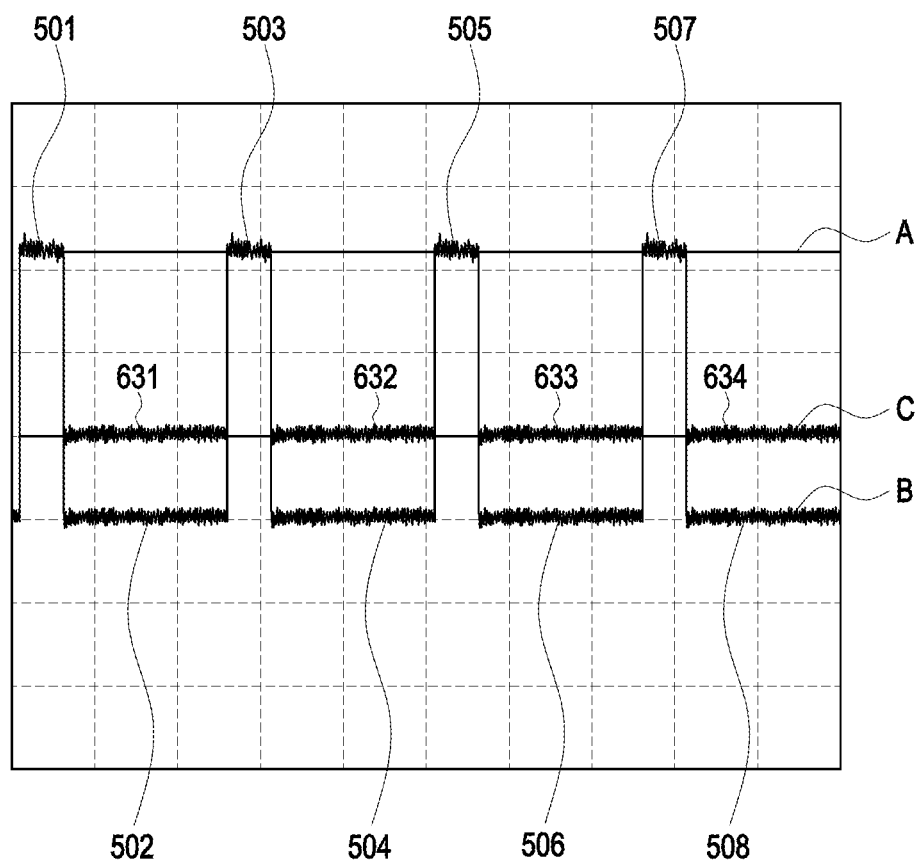
FIG. 6B illustrates a graph of voltage applied to a capacitor connected to a power amplifier according to various embodiments.

FIG. 6A is a flowchart for illustrating an operation method of an electronic device according to various embodiments. The embodiment of FIG. 6A will be described with reference to FIG. 6B. FIG. 6B illustrates a graph of voltage applied to a capacitor connected to a power amplifier according to various embodiments.

According to various embodiments, the electronic device 101 (e.g., at least one of the processor 301 or the communication processor 303) may determine, in operation 601, whether an audible noise-associated event has occurred. In an example, the communication processor 303 may receive, from the processor 301, an indication indicating occurrence of the audible noise-associated event. The communication processor 303 may determine by itself whether an audible noise-associated event has occurred, based on acquired information. According to various implementations, the communication processor 303 and the processor 301 (e.g., an application processor) may be implemented as one entity (or one package), in which case, whether an audible noise-associated event has occurred may be determined based on information acquired by a corresponding entity.

According to various embodiments, when no audible noise-associated event has occurred (No in operation 601), the electronic device 101 may identify, in operation 603, based on first association information between multiple driving voltages and multiple transmission powers of RF signals, at least one first driving voltage corresponding to at least one first transmission power of at least one first RF signal. For example, Table 1 is an example of first association information.

TABLE 1

| PA state | Transmission power (dBm) | Driving voltage Vcc (V) |
|---|---|---|
| High | 29 | 4.7 |
|  | 28 | 4.4 |
|  | 27 | 4.2 |
|  | 26 | 3.9 |
|  | 25 | 3.5 |
|  | 24 | 3.2 |
|  | 23 | 3.0 |
|  | 22 | 2.8 |
|  | 21 | 2.6 |
|  | 20 | 2.3 |
|  | 19 | 2.0 |
|  | 18 | 1.8 |
|  | 17 | 1.7 |
|  | 16 | 1.6 |
|  | 15 | 1.5 |
|  | 13 | 1.4 |
|  | 11 | 1.3 |
|  | 10 | 1.2 |
| Low | 20 | 2.5 |
|  | 18 | 2.0 |
|  | 16 | 1.7 |
|  | 14 | 1.4 |
|  | 12 | 1.2 |
|  | 11 | 1.1 |
|  | 10 | 1.0 |
|  | 8 | 1.0 |
|  | 6 | 1.0 |
|  | 4 | 1.0 |
|  | 2 | 1.0 |
|  | 0 | 1.0 |
|  | -2 | 1.0 |
|  | -6 | 1.0 |
|  | -8 | 1.0 |
|  | -10 | 1.0 |
|  | -15 | 1.0 |

The transmission power in Table 1 may refer to a transmission power determined to be a value equal to or less than a maximum transmission power level (MTPL), and may be referred to as, for example, output power. In another example, the transmission power in Table 1 may refer to the maximum transmission power level. For example, the PA state in Table 1 may be selected according to a gain of a power amplifier. Association information of the case where the PA state is "High" may be referenced when the gain of the power amplifier is configured to be relatively high, and association information of the case where the PA state is "Low" may be referenced when the gain of the power amplifier is configured to be relatively high. For example, if a transmission power of a specific RF signal is identified to be 24 dBm, the electronic device 101 may identify a driving voltage of 3.2 V corresponding to 24 dBm with reference to the first association information shown in Table 1. It may be identified that a minimum value of the driving voltages of first association information is 1.0 V. For example, a driving voltage corresponding to a transmission power of 10 dBm or less may be 1.0 V. In operation 605, the electronic device 101 may control a first converter of at least one converter, which corresponds to a first power amplifier corresponding to at least one first RF signal from among at least one power amplifier, so that the at least one first driving voltage is applied to the first power amplifier. In this case, a peak-to-peak value (in other words, a maximum-minimum difference) of voltage applied to a first capacitor corresponding to the first power amplifier from among at least one capacitor while at least one first driving voltage is being applied may be a first value. For example, referring to FIG. 6B, the electronic device 101 may identify a driving voltage of a first voltage A corresponding to a first transmission power of an RF signal with reference to first association information. In addition, the electronic device 101 may identify a driving voltage of a second voltage B corresponding to a second transmission power (e.g., a value equal to 10 dBm or less) of the RF signal with reference to the first association information. If the first association information is as shown in Table 1, the second voltage B may be 1.0 V. Accordingly, the peak-to-peak value of voltage applied to the first capacitor may be the first value (e.g., A-B). According to various embodiments, when the audible noise-associated event has occurred (Yes in operation 601), the electronic device 101 may identify, in operation 607, based on second association information between multiple driving voltages and multiple transmission powers of RF signals, at least one second driving voltage corresponding to at least one first transmission power of at least one first RF signal. For example, Table 2 is an example of second association information.

TABLE 2

| PA state | Transmission power (dBm) | Driving voltage Vcc (V) |
|---|---|---|
| High | 29 | 4.7 |
| | 28 | 4.4 |
| | 27 | 4.2 |
| | 26 | 3.9 |
| | 25 | 3.5 |
| | 24 | 3.2 |
| | 23 | 3.0 |
| | 22 | 2.8 |
| | 21 | 2.6 |
| | 20 | 2.3 |
| | 19 | 2.0 |
| | 18 | 2.0 |
| | 17 | 2.0 |
| | 16 | 2.0 |
| | 15 | 2.0 |
| | 13 | 2.0 |
| | 11 | 2.0 |
| | 10 | 2.0 |
| Low | 20 | 2.0 |
| | 18 | 2.0 |
| | 16 | 2.0 |
| | 14 | 2.0 |
| | 12 | 2.0 |
| | 11 | 2.0 |
| | 10 | 2.0 |
| | 8 | 2.0 |
| | 6 | 2.0 |
| | 4 | 2.0 |
| | 2 | 2.0 |
| | 0 | 2.0 |
| | -2 | 2.0 |
| | -6 | 2.0 |
| | -8 | 2.0 |
| | -10 | 2.0 |
| | -15 | 2.0 |

It may be identified that a minimum value of the driving voltages of second association information is 2.0 V. For example, driving voltages corresponding to transmission powers of 19 dBm or less may be 2.0 V. For example, a minimum value (e.g., 2.0 V in Table 2) of the driving voltages in the second association information referenced when the audible noise-associated event has been detected may be greater than a minimum value (e.g., 1.0 V in Table 1) of the driving voltages in the first association information referenced when no audible noise-associated event has been detected. In operation 609, the electronic device 101 may control a first converter of at least one converter, which corresponds to a first power amplifier corresponding to at least one first RF signal from among at least one power amplifier, so that the at least one second driving voltage is applied to the first power amplifier. In this case, a peak-to-peak value of voltage applied to a first capacitor corresponding to the first power amplifier from among at least one capacitor while at least one second driving voltage is being applied may be a second value. For example, referring to FIG. 6B, the electronic device 101 may identify a driving voltage of a first voltage A corresponding to a first transmission power of an RF signal with reference to second association information. In addition, the electronic device 101 may identify a driving voltage of a third voltage C corresponding to a second transmission power (e.g., a value equal to 19 dBm or less) of the RF signal with reference to the first association information. If the second association information is as shown in Table 2, the third voltage C may be 2.0 V. Accordingly, the peak-to-peak value of voltage applied to the first capacitor may be the second value (e.g., A-C). The electronic device 101 may control the first converter to apply some parts 501, 503, 505, and 507 of the second driving voltages and some other parts 631, 632, 633, and 634 of the second driving voltages to the first power amplifier. The second value (e.g., A-C) that is the peak-to-peak value of voltage applied to the capacitor when the audible noise-associated event has been detected may be less than the first value (e.g., A-B) that is the peak-to-peak value of voltage applied to the capacitor when no audible noise-associated event has been detected. This results from the minimum value of the driving voltages of association information referenced when the audible noise-associated event being detected is greater than the minimum value of the driving voltages of association information referenced when no audible noise-associated event has been detected. Accordingly, as the second value that is the peak-to-peak value of voltage applied to the capacitor when the audible noise-associated event has been detected is relatively small, a degree of change in the shape of the capacitor may also be relatively small. As the degree of change in the shape of the capacitor is small, the magnitude of audible noise may also be relatively small. As the minimum value of the driving voltages increases, a linearity, an adjacent channel leakage power ratio (ACLR), a spectrum emission mask (SEM), and/or a spurious level may become better.

Table 3 shows experimental results of noise levels generated when a driving voltage is configured using the first association information as shown in Table 1 despite the occurrence of audible noise.

TABLE 3

| Set number | NR | LTE-mid and/or LTE-high band | LTE-low band |
|---|---|---|---|
| 1 | 3.25 | 3 | 3 |
| 2 | 3 | 3 | 3 |
| 3 | 3 | 3 | 3.25 |
| 4 | 3 | 3.25 | 3 |

TABLE 3-continued

| Set number | NR | LTE-mid and/or LTE-high band | LTE-low band |
|---|---|---|---|
| 5 | 3 | 3 | 3 |
| 6 | 3 | 3 | 3 |
| 7 | 3 | 2.75 | 3 |
| 8 | 2.75 | 3 | 3 |

The set number in Table 3 may refer to a number for counting multiple finished products for one model. For example, the existence of the set numbers of 1 to 8 may indicate that noise level experiments are performed on 8 different finished products of the "XX model". The experiments have been conducted separately for each frequency band. For example, Table 3 includes experimental results for RF signals of frequencies included in NR (or ultra-high band), experimental results for medium and/or high bands of LTE, and experimental results for low bands of LTE. A relatively high noise level may indicate, for example, greater audible noise. Table 4 shows experimental results of noise levels generated when a driving voltage is configured using the second association information as shown in Table 2 according to the occurrence of audible noise.

TABLE 4

| Set number | NR | LTE-mid and/or LTE-high band/high | LTE-low band |
|---|---|---|---|
| 1 | 1.75 | 1.5 | 1.5 |
| 2 | 1.5 | 1.5 | 1.5 |
| 3 | 1.75 | 1.5 | 1.75 |
| 4 | 1 | 1.75 | 1.5 |
| 5 | 1 | 1 | 1 |
| 6 | 1.5 | 1 | 1 |
| 7 | 1.5 | 1 | 1 |
| 8 | 1 | 1 | 1 |

It may be identified that the noise levels according to the experimental results of Table 4 are lower than the noise levels according to the experimental results of Table 3. For example, it may be identified that, while the noise level of set number 1 in a frequency band of NR of set number "1" in Table 4 is "1.75", the noise level of set number 1 in a frequency band of NR of set number "1" in Table 3 is "3.25". As described above, when the audible noise-associated event has occurred, second association information having a relatively high minimum value is referenced to determine a driving voltage, so that a noise level may be reduced.

As described above, when the audible noise-associated event has been detected, the electronic device 101 may identify a driving voltage with reference to association information in which a minimum value of the driving voltage is configured to be relatively high. Accordingly, while a user is making a call using a receiver, a noise level in the receiver may be reduced. The aforementioned scheme of referencing association information in which a minimum value of a driving voltage is configured to be relatively high is merely a non-limiting example, and it will be understood by those skilled in the art that there is no limitation as long as a scheme enables reduction of the magnitude of a peak-to-peak of voltage applied to a capacitor.

Figure 7:
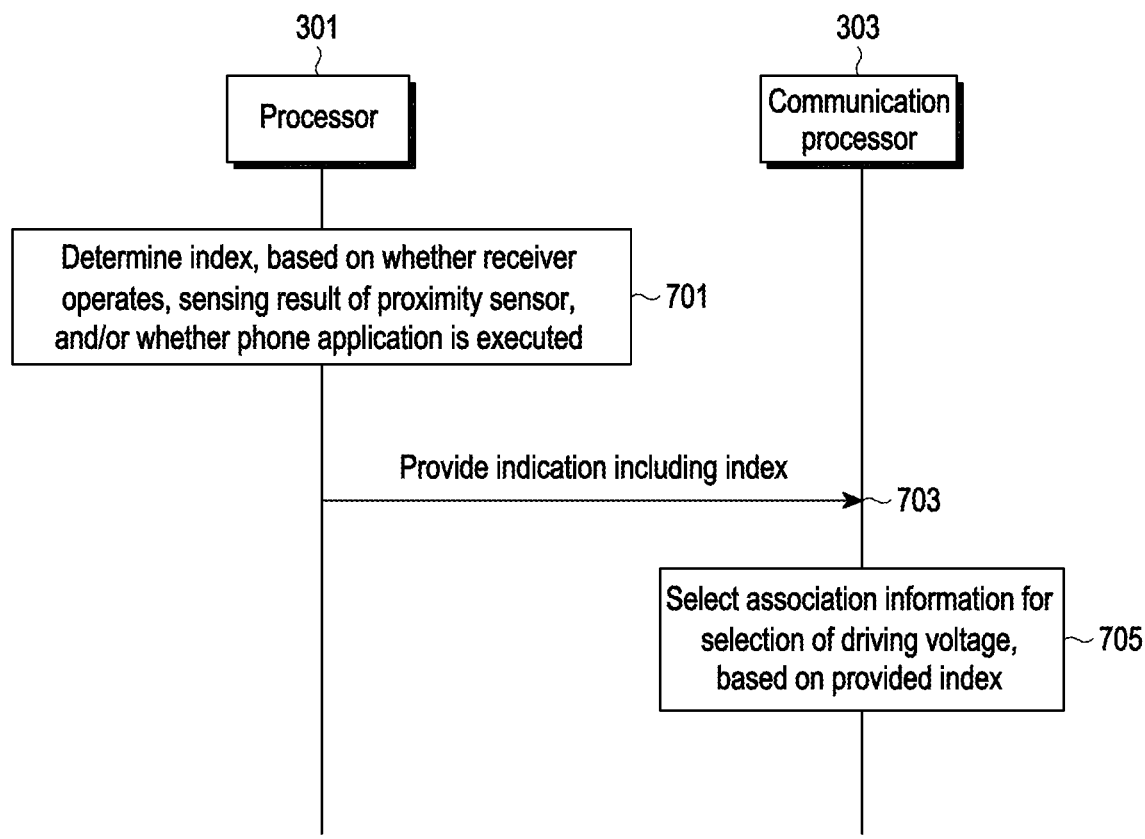
FIG. 7 is a flowchart for illustrating a method of operating a processor and a communication processor according to various embodiments.

FIG. 7 is a flowchart for illustrating a method of operating a processor and a communication processor according to various embodiments.

According to various embodiments, in operation 701, the processor 301 may determine an index, based on whether a receiver operates, a sensing result of a proximity sensor, and/or whether a phone application is executed. For example, when the receiver 307 operates, the processor 301 may configure an index (e.g., 1) indicating that an audible noise-associated event is generated. For example, the processor 301 may configure an index (e.g., 1) indicating that an audible noise-associated event occurs when "proximity" is identified based on a sensing result of the proximity sensor. For example, when a phone service-related application (e.g., a phone application, an application supporting a transmission/reception function of a sound packet (or a packet for a video call), or an application of sound output) is executed, the processor 301 may configure an index (e.g., 1) indicating that an audible noise-associated event is generated. For example, based on the above-described various examples or a combination of at least two thereof, the processor 301 may configure an index (e.g., 1) indicating that an audible noise-associated event is generated. In operation 703, the processor 301 may provide the communication processor 303 with an indication including the index (e.g., 1) indicating that the audible noise-associated event is generated. The processor 301 may provide the communication processor 303 with an indication including an index (e.g., 1) indicating occurrence of the audible noise-associated event or an index (e.g., 0) indicating no occurrence of the audible noise-associated event, periodically or based on occurrence or no occurrence of the event. In operation 705, the communication processor 303 may select, based on the provided index, association information for selecting of a driving voltage. For example, if the index (e.g., 1) indicating occurrence of the audible noise-associated event is provided, the communication processor 303 may select association information (e.g., association information as shown in Table 2) having a relatively high minimum value. According to selection of association information (e.g., association information as shown in Table 2) having a relatively high minimum value, a peak-to-peak of a voltage applied to a capacitor may be relatively small. Accordingly, the magnitude of audible noise may be relatively small. For example, if the index (e.g., 0) indicating no occurrence of the audible noise-associated event is provided, the communication processor 303 may select association information (e.g., association information as shown in Table 1) having a relatively low minimum value. Since no occurrence of the audible noise-associated event may indicate that a user does not put the receiver to the ear for a phone service, the communication processor 303 may use association information as shown in Table 1 to save power even when the audible noise is relatively large. In another example, the communication processor 303 may acquire information on whether the receiver operates, a sensing result of the proximity sensor, and/or whether a phone application is executed, and may directly identify whether the audible noise-associated event has occurred, based on the acquired information. The communication processor 303 may directly identify whether the audible noise-associated event has occurred, based on whether a VoIP service (e.g., VoLTE or VoNR) is being performed. The communication processor 303 may receive, from the processor 301, whether VoWiFi is being executed, and may directly identify whether the audible noise-associated event has occurred, based on whether VoWiFi is being executed. In another example, the processor 301 may determine, based on whether VoWiFi is being executed, an index indicating whether the audible noise-associated event has occurred, and may provide the index to the communication processor 303. The aforementioned scheme of identifying, by the processor 301 and/or the communication processor 303, whether an audible noise-associated event has occurred, and/or a subject are merely a non-limiting example, and it will be understood by those skilled in the art that the disclosure is not limited thereto.

Figure 8:
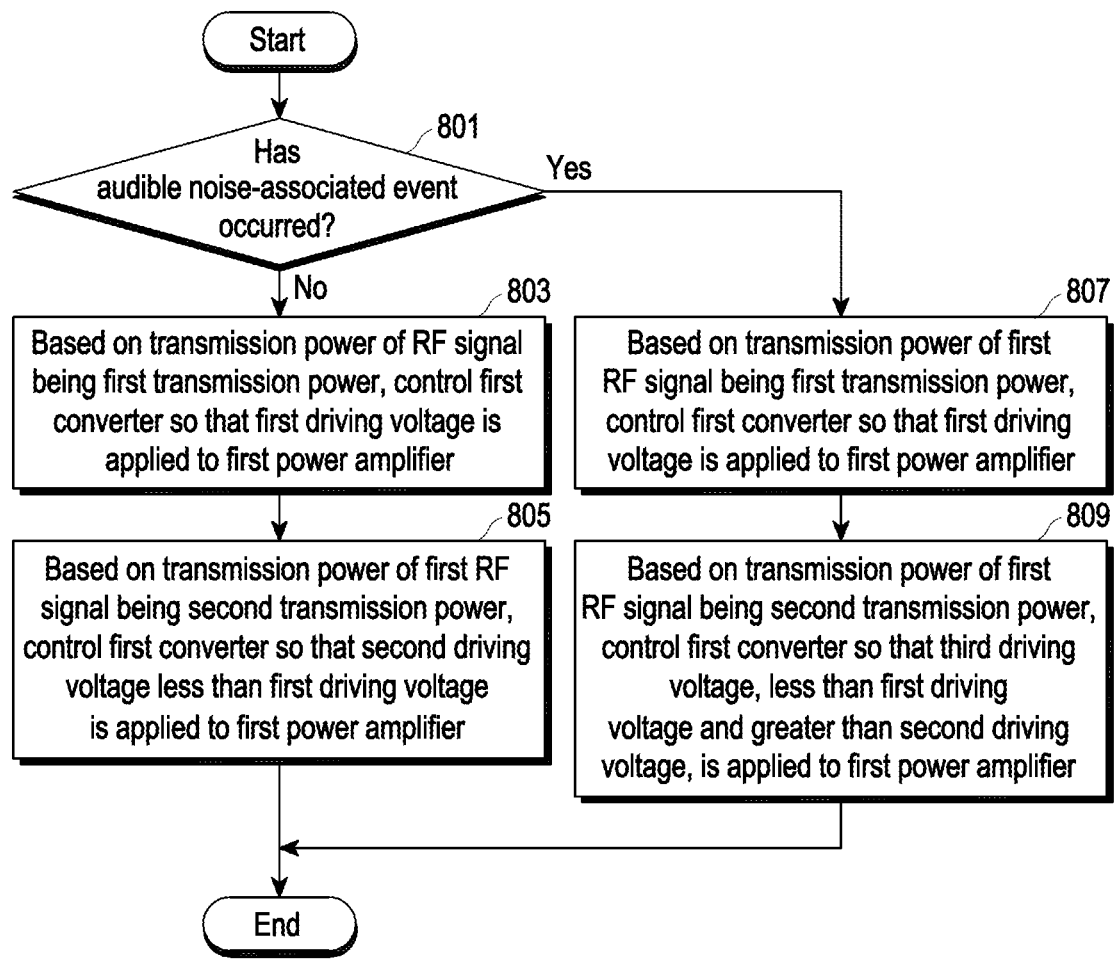
FIG. 8 is a flowchart for illustrating a method of operating an electronic device according to various embodiments.

FIG. 8 is a flowchart for illustrating a method of operating an electronic device according to various embodiments.

According to various embodiments, the electronic device 101 (e.g., at least one of the processor 301 or the communication processor 303) may determine, in operation 801, whether an audible noise-associated event has occurred. If no audible noise-associated event occurs (No in operation 801), in operation 803, based on a transmission power of a first RF signal being a first transmission power, the electronic device 101 may control a first converter of at least one converter, which corresponds to a first power amplifier corresponding to the first RF signal from among at least one power amplifier, so that a first driving voltage is applied to the first power amplifier. In operation 805, based on the transmission power of the first RF signal being a second transmission power less than the first transmission power, the electronic device 101 may control the first converter so that a second driving voltage less than the first driving voltage is applied to the first power amplifier corresponding to the first RF signal from among at least one power amplifier. For example, the electronic device 101 may determine the driving voltage to be 3.9 V, based on the transmission power of the first RF signal being 26 dBm. For example, the electronic device 101 may determine the driving voltage to be 1.0 V, based on the transmission power of the first RF signal being 8 dBm. If the audible noise-associated event occurs (Yes in operation 801), in operation 807, based on the transmission power of the first RF signal being the first transmission power, the electronic device 101 may control the first converter so that the first driving voltage is applied to the first power amplifier. For example, the electronic device 101 may determine the driving voltage to be 3.9 V, based on the transmission power of the first RF signal being 26 dBm. That is, with respect to both of the case where the audible noise-associated event has occurred and the case where no audible noise-associated event has occurred, the electronic device 101 may identify the same driving voltage for a transmission power of a specific value or greater. In operation 809, based on the transmission power of the first RF signal being the second transmission power less than the first transmission power, the electronic device 101 may control the first converter corresponding to the first power amplifier so that a third driving voltage less than the first driving voltage and is greater than the second driving voltage is applied to the first power amplifier. For example, the electronic device 101 may determine the driving voltage to be 2.0 V, based on the transmission power of the first RF signal being 8 dBm. With respect to each of the case where the audible noise-associated event has occurred and the case where no audible noise-associated event has occurred, the electronic device 101 may identify different driving voltages for a transmission power less than the specific value. A difference between a first voltage value, which is applied to a first capacitor corresponding to the first converter from among at least one capacitor while the first driving voltage is being applied to the first power amplifier, and a second voltage applied to the first capacitor while the second driving voltage is being applied to the first power amplifier, may be referred to as a first voltage difference, which may be a voltage difference when no audible noise-associated event has occurred. A difference between the first voltage value and a third voltage applied to the first capacitor while the third driving voltage is being applied to the first power amplifier may be referred to as a second voltage difference, which may be a voltage difference when the audible noise-associated event has occurred. The first voltage difference may be greater than the second voltage difference, which may indicate that the voltage difference of the case where the audible noise-associated event has occurred is relatively small.

Figure 9:
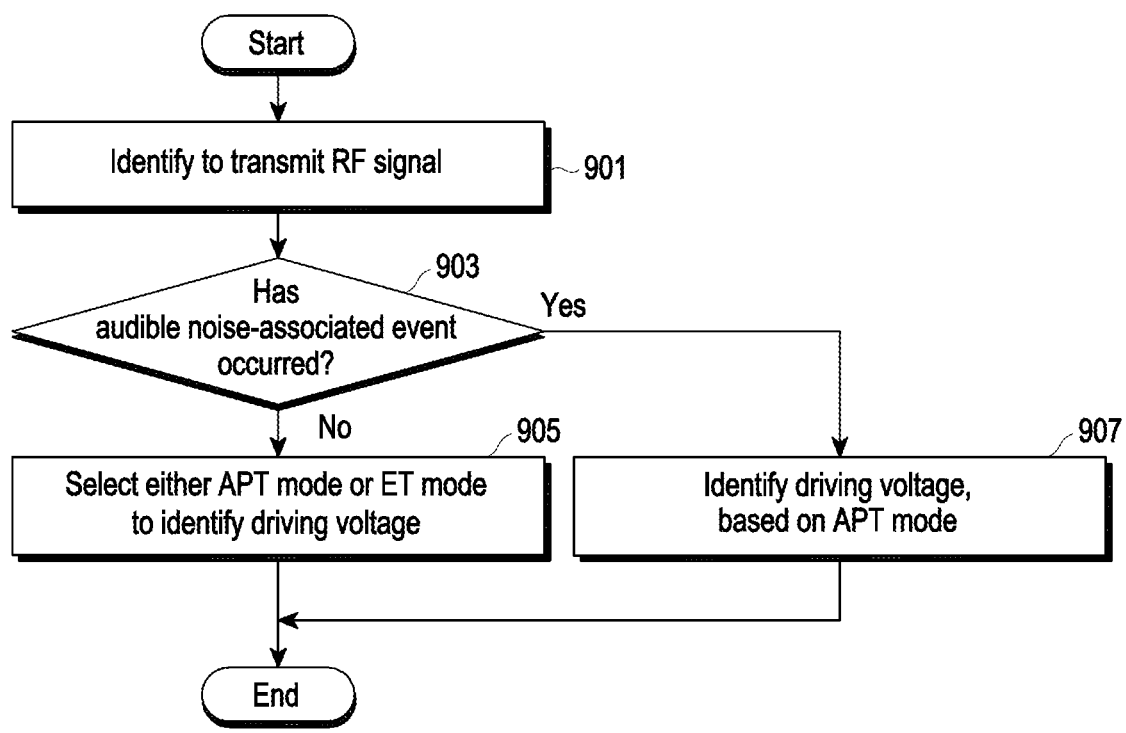
FIG. 9 is a flowchart for illustrating a method of operating an electronic device according to various embodiments.

FIG. 9 is a flowchart for illustrating a method of operating an electronic device according to various embodiments.

According to various embodiments, the electronic device 101 (e.g., at least one of the processor 301 or the communication processor 303) may identify, in operation 901, that an RF signal is to be transmitted. In operation 903, the electronic device 101 may identify whether an audible noise-associated event has occurred. If no audible noise-associated event has occurred (No in operation 903), the electronic device 101 may select either an APT mode or an ET mode to identify a driving voltage, in operation 905. For example, the electronic device 101 may determine whether to use the APT mode or the ET mode, based on a transmission power of the RF signal. If the transmission power of the RF signal is equal to or greater than a threshold transmission power (e.g., 16 dBm), the electronic device 101 may configure the driving voltage using the ET mode. If the transmission power of the RF signal is less than a threshold transmission power (e.g., 16 dBm), the electronic device 101 may configure the driving voltage using the APT mode. Selecting either the APT mode or the ET mode based on the transmission power of the RF signal is merely a non-limiting example, and there is no limitation on criteria for selecting the APT mode or the ET mode. If the audible noise-associated event has occurred (Yes in operation 903), the electronic device 101 may identify the driving voltage, based on the APT mode in operation 907. In this case, the electronic device 101 may identify the driving voltage, based on the APT mode without using the ET mode. For example, as described above, when no audible noise-associated event has occurred, the electronic device 101 may be configured to select either the APT mode or the ET mode, based on the transmission power of the RF signal. When the audible noise-associated event has occurred, although the transmission power of the RF signal satisfies a condition for selecting the ET mode, the electronic device 101 may identify the driving voltage by using the APT mode. As described with reference to FIG. 4C, the time interval for configuring (or changing) of the driving voltage in the ET mode may be shorter than the time interval for configuring (or changing) of the driving voltage in the APT mode, and a possibility that audible noise is generated may be relatively high in the ET mode. A change in the driving voltage may also occur depending on switching between the APT mode and the ET mode, and there is also a possibility that audible noise is to be generated accordingly. Therefore, when the audible noise-associated event has occurred, the electronic device 101 may disable the ET mode, thereby configuring the driving voltage using the APT mode. In an example, according to FIG. 9, when the audible noise-associated event has occurred, the electronic device 101 may disable the ET mode, thereby configuring the driving voltage using the APT mode. In another example, when the audible noise-associated event has occurred, the electronic device 101 may disable the ET mode while using association information having a relatively high minimum driving voltage as described above. It will be understood by those skilled in the art that disabling of the ET mode in the case where the audible noise-associated event has occurred may be performed together with various embodiments of the disclosure.

Figure 10:
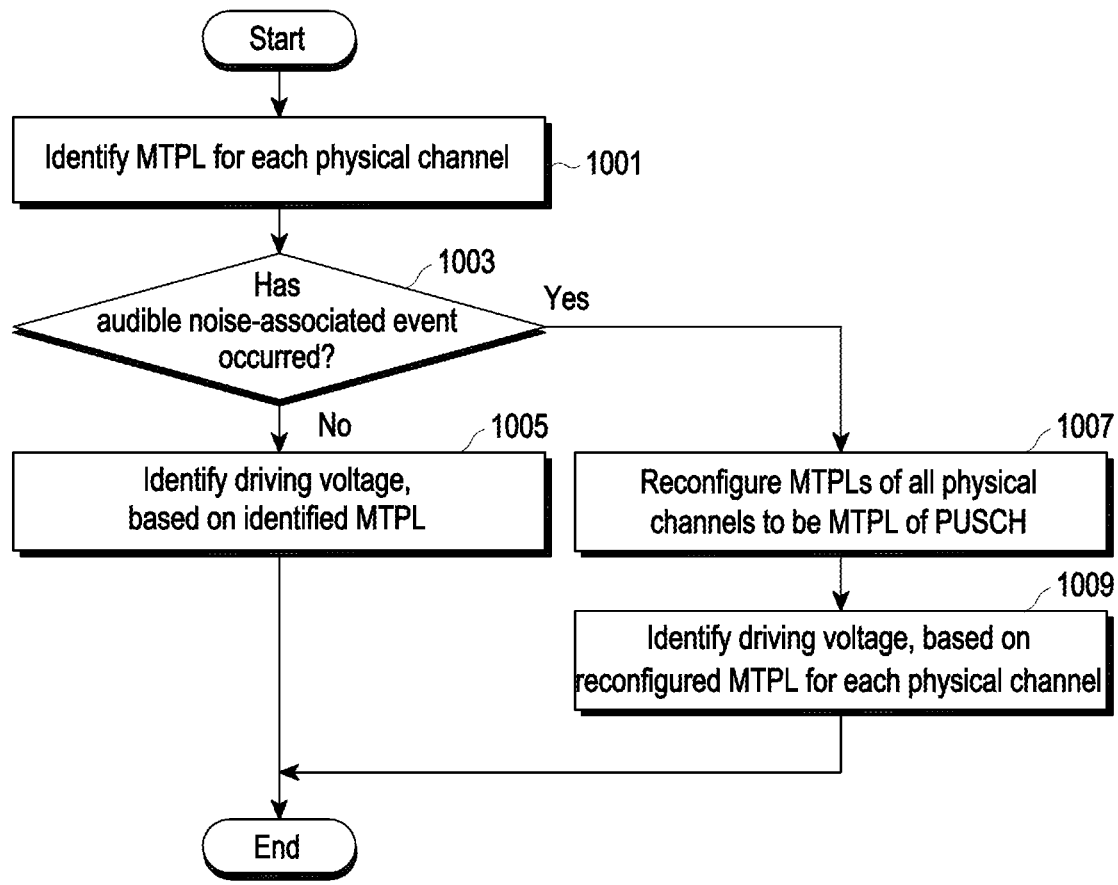
FIG. 10 is a flowchart for illustrating a method of operating an electronic device according to various embodiments.
Figure 11A:
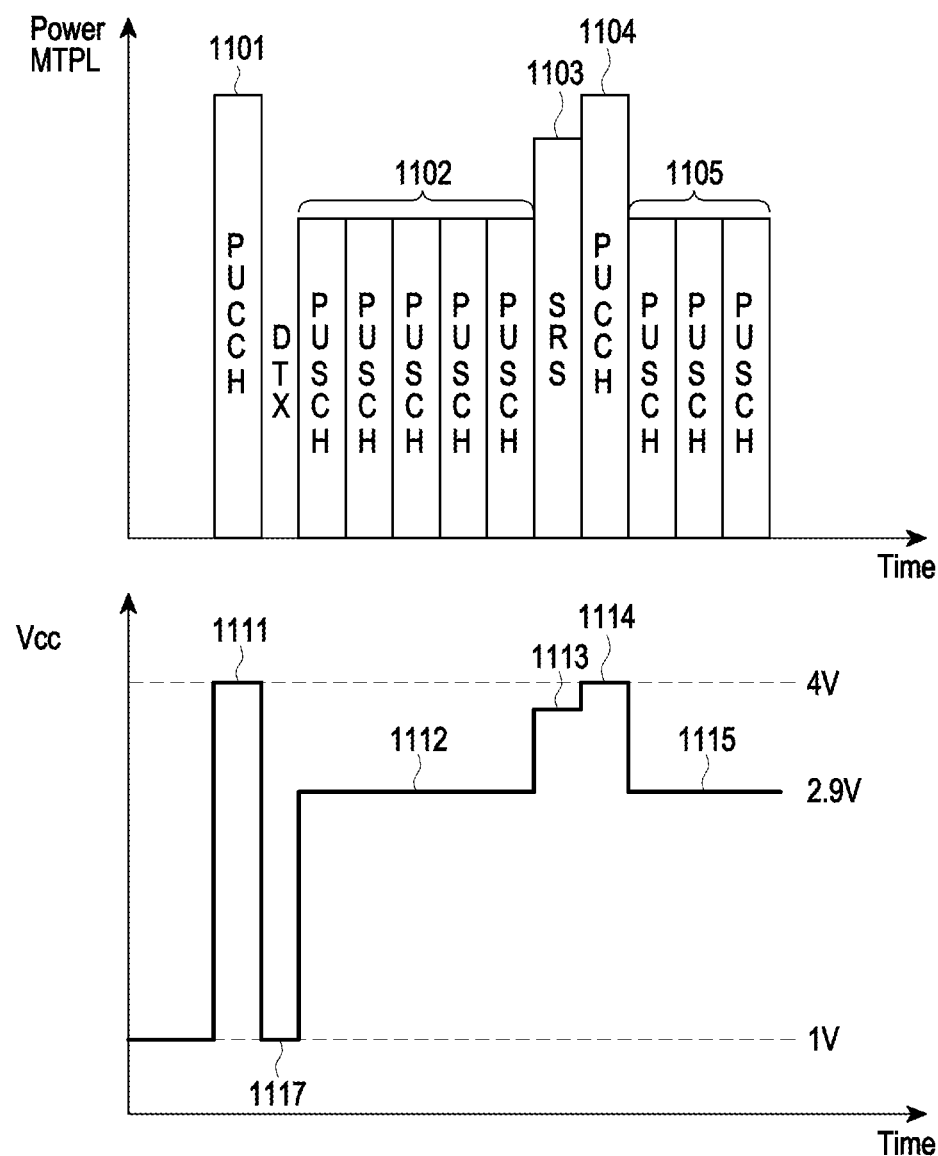
FIG. 11A is a diagram for illustrating a maximum transmission power level (MTPL) for each physical channel and a driving voltage of a power amplifier according to various embodiments.
Figure 11B:
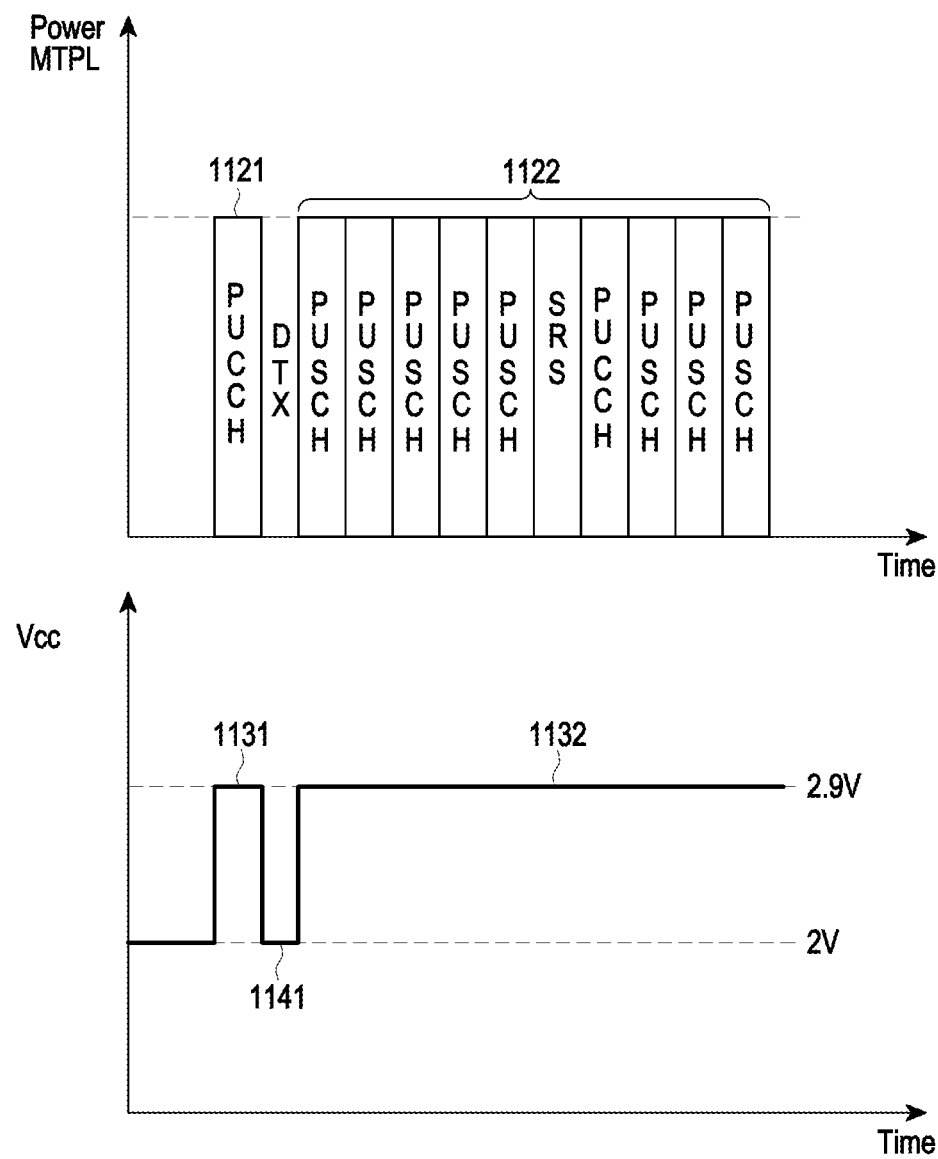
FIG. 11B is a diagram for illustrating a readjusted MTPL and a driving voltage of a power amplifier according to various embodiments.

FIG. 10 is a flowchart for illustrating a method of operating an electronic device according to various embodiments. The embodiment of FIG. 10 will be described with reference to FIG. 11A and FIG. 11B. FIG. 11A is a diagram for illustrating a maximum transmission power level (MTPL) for each physical channel and a driving voltage of a power amplifier according to various embodiments. FIG. 11B is a diagram for illustrating a readjusted MTPL and a driving voltage of a power amplifier.

According to various embodiments, the electronic device 101 (e.g., at least one of the processor 301 or the communication processor 303) may identify a maximum transmission power level (MTPL) for each physical channel in operation 1001. A transmission power of an RF signal for a specific physical channel may be determined to be less than or equal to an MTPL. In an example, the transmission power described in FIG. 6A may refer to, for example, an MTPL, or in another example, the transmission power described in FIG. 6A may refer to a transmission power configured to be equal to or less than an MTPL. The disclosure is not limited thereto. For example, the electronic device 101 may determine the MTPL, based on a maximum output power (e.g., a UE maximum output power of 3GPP technical specification (TS) 38.101) according to a power class of the electronic device 101, power by signaling of a network, maximum power reduction (MPR) backoff, and/or additional maximum power reduction (AMPR) backoff, and there is no limitation on a scheme of determining the MTPL. The MTPL may be determined differently for each physical channel, for example. In operation 1003, the electronic device 101 may identify whether an audible noise-associated event has occurred. If no audible noise-associated event has occurred (No in operation 1003), the electronic device 101 may identify a driving voltage of a power amplifier, based on the MTPL for each physical channel, in operation 1005. For example, referring to FIG. 11A, the electronic device 101 may determine MTPLs 1101, 1102, 1103, 1104, and 1105 for each physical channel of PUCCH, PUSCH, and SRS. The electronic device 101 may identify driving voltages 1111, 1112, 1113, 1114, and 1115 corresponding to the MTPLs. For discontinuous transmission (DTX), the electronic device 101 may apply, for example, a minimum driving voltage (e.g., 1 V) 1117 to the power amplifier. In this case, for example, when the driving voltage 1117 is applied after the driving voltage 1111 is applied, a voltage drop is relatively large, and the magnitude of the audible noise may be thus relatively large. However, if no audible noise-associated event occurs, the electronic device 101 may apply the MTPLs 1101, 1102, 1103, 1104, and 1105 for each physical channel of PUCCH, PUSCH, and SRS, and driving voltages 1111, 1112, 1113, 1114, 1115, and 1117 corresponding to DTX. The electronic device 101 may identify a corresponding transmission power equal to or less than the MTPL for each physical channel. Then, the electronic device 101 may control a corresponding power amplifier so that an RF signal of the identified transmission power is applied to an antenna. Since the transmission power is determined to be a value equal to or less than the MTPL, the driving voltage applied to the power amplifier may also be reduced.

According to various embodiments, if the audible noise-associated event has occurred (Yes in operation 1003), the electronic device 101 may reconfigure MTPLs of all physical channels to be the MTPL of the PUSCH, in operation 1007. In operation 1009, the electronic device 101 may identify the driving voltage of the power amplifier, based on the reconfigured MTPL for each physical channel. As described above, when an MTPL is reconfigured (e.g., decreased), a transmission power may also decrease, and accordingly, a driving voltage may also decrease. For example, referring to FIG. 11B, it can be identified that MTPLs 1121 and 1122 of physical channels of PUCCH, PUSCH, and SRS are all configured to the MTPL of PUSCH in FIG. 11A. The electronic device 101 may identify driving voltages 1131 and 1132 corresponding to the MTPLs 1121 and 1122. For discontinuous transmission, the electronic device 101 may apply, for example, a minimum driving voltage (e.g., 2 V) 1141 to the power amplifier. Accordingly, a peak-to-peak of voltage is, for example, 2.9-2=0.9 V, which may be less than 2.9-1=1.9 V in FIG. 11A, so that the magnitude of audible noise may also be reduced. As described with reference to FIG. 6A, the driving voltage of the minimum value in FIG. 11B may be configured to, for example, 2 V according to use of association information having an increased minimum value, but this is merely a non-limiting example. According to implementation, as shown in FIG. 11B, the electronic device 101 may reconfigure MTPLs of all physical channels to have an MTPL value of a PUSCH, while referencing association information in which a minimum value of the driving voltage is configured to be relatively high. In another example, based on occurrence of the audible noise-associated event, the electronic device 101 may reconfigure MTPLs of all physical channels to have the MTPL value of the PUSCH, in which case, a driving voltage 1141 of the minimum value in FIG. 11B may be, for example, 1 V as in FIG. 11A. It will be understood by those skilled in the art that, based on occurrence of the audible noise-associated event, configuration of the MTPLs of all physical channels to have the MTPL of the PUSCH may be performed together with not only the embodiment of FIG. 6A but also various embodiments of the disclosure. In FIG. 10, it has been described that the MTPLs of all physical channels are reconfigured to have the MTPL value of the PUSCH. However, this is also merely a non-limiting example, and in another example, the MTPLs of all physical channels may be reconfigured to have an MTPL value of one among PUCCH, SRS, or PRACH. In another example, the electronic device 101 may reconfigure MTPLs of some physical channels (a physical channel adjacent to DTX, but not limited thereto) instead of all physical channels to have the MTPL of the PUSCH (or another physical channel).

Figure 12:
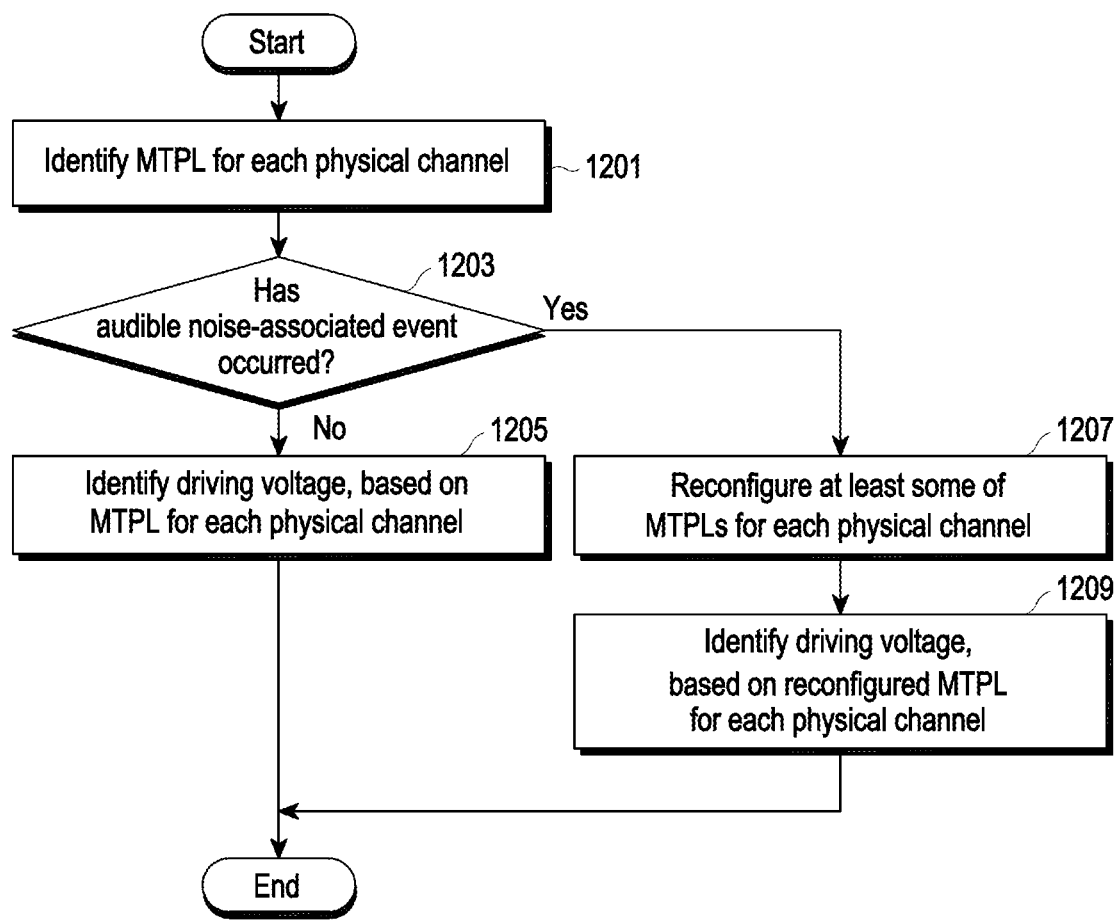
FIG. 12 is a flowchart for illustrating a method of operating an electronic device according to various embodiments.

FIG. 12 is a flowchart for illustrating a method of operating an electronic device according to various embodiments.

According to various embodiments, the electronic device 101 (e.g., at least one of the processor 301 or the communication processor 303) may identify an MTPL for each physical channel in operation 1201. In operation 1203, the electronic device 101 may identify whether an audible noise-associated event has occurred. If no audible noise-associated event has occurred (No in operation 1203), the electronic device 101 may identify a driving voltage of a power amplifier, based on the MTPL for each physical channel, in operation 1205. When no audible noise-associated event occurs, even if relatively large audible noise is generated, a possibility that a user hears the noise is low, and therefore the electronic device 101 may identify the driving voltage of the power amplifier, based on the MTPL for each physical channel. If the audible noise-associated event has occurred (Yes in operation 1203), the electronic device 101 may reconfigure at least some MTPLs for each physical channel, in operation 1207. For example, as described with reference to FIG. 10, the electronic device 101 may configure MTPLs of at least some of physical channels to have a value of an MTPL of a specific physical channel (or another designated value). The electronic device 101 may reconfigure an MTPL of at least one physical channel by adjusting an MPR backoff value. In operation 1209, the electronic device 101 may identify the driving voltage of the power amplifier, based on the reconfigured MTPL for each physical channel. It will be understood by those skilled in the art that adjustment of the MTPL of at least one physical channel in the case where the audible noise-associated event has occurred may be performed together with various embodiments of the disclosure.

Figure 13:
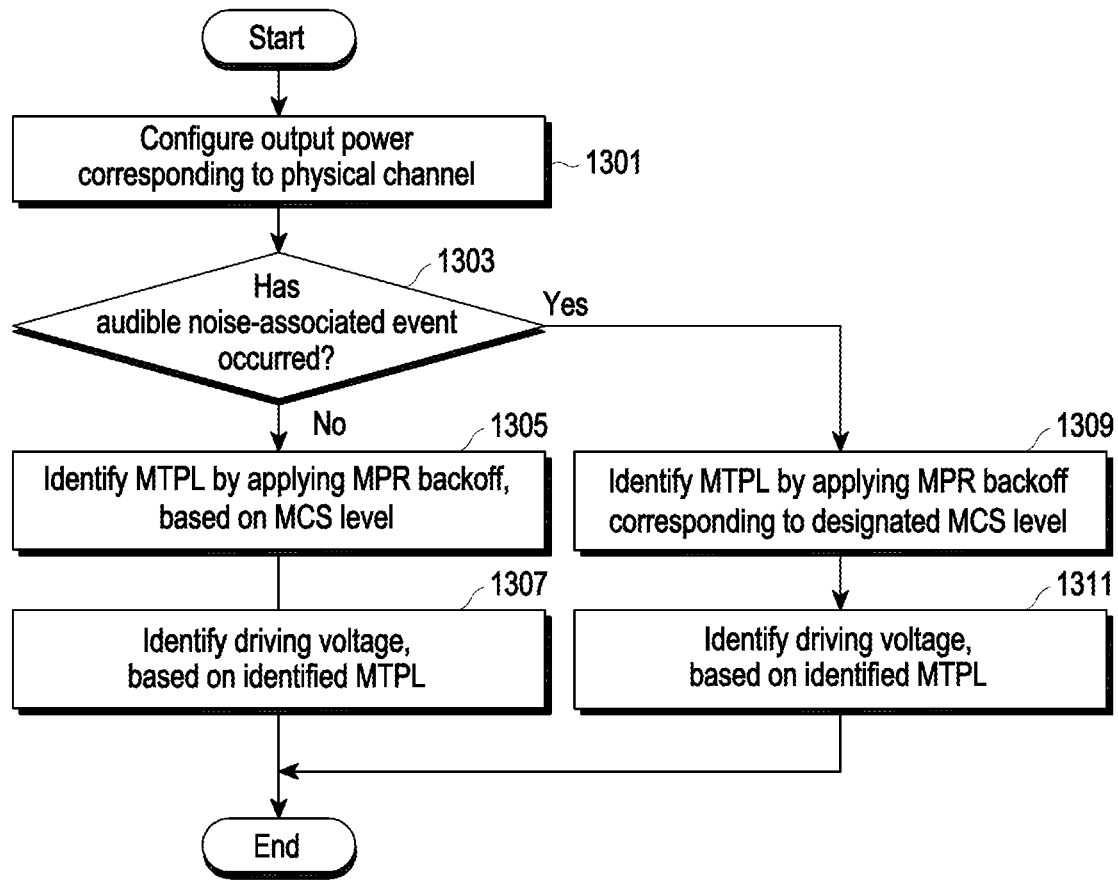
FIG. 13 is a flowchart for illustrating a method of operating an electronic device according to various embodiments.

FIG. 13 is a flowchart for illustrating a method of operating an electronic device according to various embodiments.

According to various embodiments, in operation 1301, the electronic device 101 (e.g., at least one of the processor 301 or the communication processor 303) may configure an output power corresponding to a physical channel (e.g., an output power based on a power class, but not limited thereto). In operation 1303, the electronic device 101 may identify whether an audible noise-associated event has occurred. If no audible noise-associated event has occurred (No in operation 1303), the electronic device 101 may identify an MTPL by applying MPR backoff to the configured output power, based on a currently used MCS level, in operation 1305. In operation 1307, the electronic device 101 may identify a driving voltage of a power amplifier, based on the identified MTPL. For example, while performing 128 QAM modulation, the electronic device 101 may identify an MPR backoff value corresponding to an MCS level of 64 QAM. The electronic device 101 may identify an MTPL by applying the MPR backoff to the output power. If the audible noise-associated event has occurred (Yes in operation 1303), the electronic device 101 may identify an MTPL by applying, to the output power, MPR backoff corresponding to a designated MCS level, in operation 1309. In operation 1311, the electronic device 101 may identify the driving voltage of the power amplifier, based on the identified MTPL. Here, the designated MCS level may be, for example, an MCS level corresponding to a relatively large MPR backoff value. For example, the designated MCS level may be, for example, an MCS level corresponding to 256 QAM. The MPR backoff value corresponding to the MCS level of 256 QAM may be greater than the MPR backoff value corresponding to the MCS level of 64 QAM. Accordingly, the MTPL in which the MPR backoff value corresponding to the MCS level of 256 QAM is applied to the output power may be less than the MTPL in which the MPR backoff value corresponding to the MCS level of 64 QAM is applied to the output power. That is, based on detection of the audible noise-associated event, the electronic device 101 may readjust the MTPL to be relatively small by applying a relatively large MPR backoff value. According to the MTPL being configured to be relatively small, a change (or peak-to-peak) of the driving voltage is reduced, so that the magnitude of audible noise may be reduced. It will be understood by those skilled in the art that adjusting the MTPL by applying a relatively large MPR backoff value of the case where the audible noise-associated event has occurred may be performed together with various embodiments of the disclosure.

Table 5 shows experimental results of noise levels obtained when the driving voltage is configured using second association information as shown in Table 2 in accordance with generation of audible noise, and at least one additional operation (e.g., disabling of the ET mode and/or readjustment according to various schemes of MTPL) configured for noise reduction is performed.

TABLE 5

| Set number | NR | LTE-mid and/or LTE-high band/high | LTE-low band |
|---|---|---|---|
| 1 | 1.25 | 1.25 | 1.25 |
| 2 | 1 | 1 | 1 |
| 3 | 1 | 1 | 1 |
| 4 | 1 | 1.25 | 1.25 |
| 5 | 1 | 1 |  |
| 6 | 1.25 | 1 | 1 |
| 7 | 1 | 1 | 1 |
| 8 | 1 | 1 | 1 |

It may be identified that the noise levels according to the experimental results of Table 5 are lower than the noise levels according to the experimental results of Table 4. For example, it may be identified that, while the noise level of set number 1 in a frequency band of NR of set number "1" in Table 4 is "1.75", the noise level of set number 1 in a frequency band of NR of set number "1" in Table 5 is "1.25". As described above, when the audible noise-associated event has occurred, a noise level may be further reduced in accordance with execution of various schemes of noise reduction operations.

Figure 14:
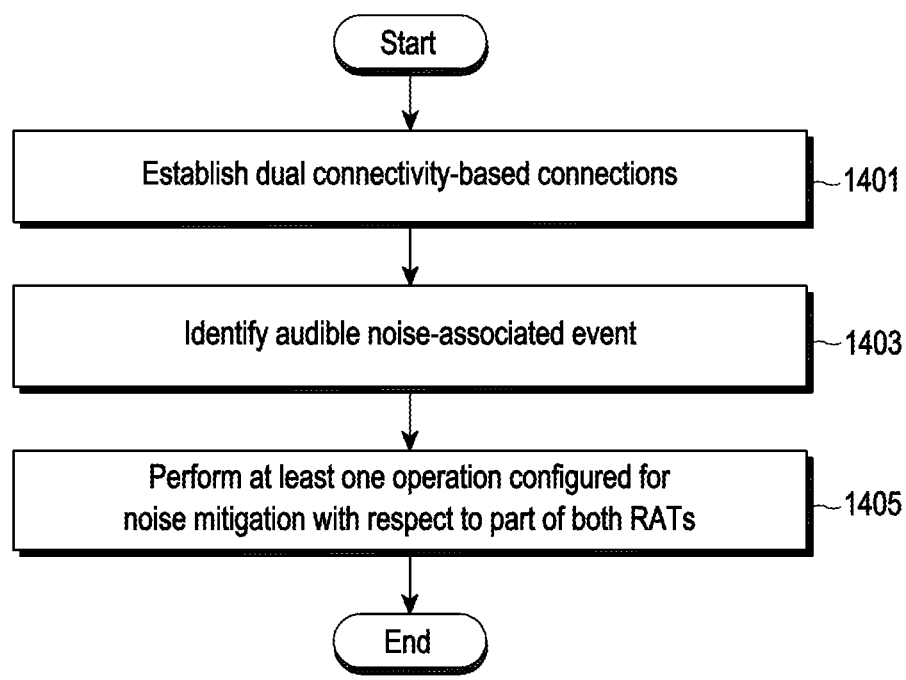
FIG. 14 is a flowchart for illustrating a method of operating an electronic device according to various embodiments.

FIG. 14 is a flowchart for illustrating a method of operating an electronic device according to various embodiments.

According to various embodiments, the electronic device 101 (e.g., at least one of the processor 301 or the communication processor 303) may establish dual connectivity-based connections in operation 1401. For example, after establishing a radio resource control (RRC) connection to a master node (MN) based on a first RAT (e.g., E-UTRA), the electronic device 101 may receive an RRC reconfiguration message from the MN. The RRC reconfiguration message may include a measurement object (MO) associated with a second RAT (e.g., NR). The electronic device 101 may measure at least one frequency of the MO, and may report measurement to the MN, based on a fact that a measurement result satisfies a reporting condition. In response to the measurement report, the MN may provide the electronic device 101 with the RRC reconfiguration message of a secondary cell group (SCG) addition configuration. The electronic device 101 may establish an RRC connection to a secondary node (SN), based on reception of the RRC reconfiguration message. Accordingly, connections based on dual connectivity may be established. In operation 1403, the electronic device 101 may identify an audible noise-associated event. Based on identification of the audible noise-associated event, the electronic device 101 may perform at least one operation configured for noise mitigation with respect to at least a part of both RATs, in operation 1405. In an example, the electronic device 101 may perform at least one operation configured for noise mitigation with respect to both RATs. For example, even when the electronic device 101 performs evolved packet system (EPS) fallback (FB) for a VoIP service, there may be a case where an RRC connection of NR is maintained, so that the electronic device 101 may perform at least one operation configured for noise mitigation for both RATs.

In another example, the electronic device 101 may perform at least one operation configured for noise mitigation only with respect to one of both RATs. For example, the electronic device 101 may perform at least one operation configured for noise mitigation only with respect to a RAT corresponding to a capacitor located relatively close to a receiver, but this is merely a non-limiting example, and the disclosure is not limited thereto. Performing of at least one operation configured for noise mitigation for at least one RAT when dual connectivity-based connections are established is merely a non-limiting example. It will be understood by those skilled in the art that, even when a connection to at least one RAT has been established, the electronic device 101 according to various embodiments may perform at least one operation configured for noise mitigation with respect to at least one RAT. Alternatively, the electronic device 101 may perform at least one operation configured for noise mitigation with respect to a RAT (or band) in which a call connection has been established.

According to various embodiments, an electronic device (e.g., the electronic device 101) may include at least one communication processor (e.g., at least one of the first communication processor 212, the second communication processor 214, an integrated communication processor 260, or the communication processor 303) configured to output at least one baseband signal, a radio frequency integrated circuit (RFIC) (e.g., at least one of the first RFIC 222, the second RFIC 224, the third RFIC 226, the fourth RFIC 228, or the RFIC 310) configured to output at least one RF signal generated based on the at least one baseband signal, at least one power amplifier (e.g., at least one of the first RFFE 232, the second RFFE 234, the third RFFE 238, or at least one the power amplifiers 321, 331, and 341) configured to amplify the at least one RF signal and output amplified at least one RF signal to at least one antenna, and at least one converter (e.g., at least one the converter 323, the converter 333, or the converter 343) comprising circuitry configured to provide a driving voltage for amplification of the at least one RF signal to the at least one power amplifier, wherein at least one capacitor (e.g., the capacitor 325, the capacitor 335, or the capacitor 345) is connected between the at least one converter and the at least one power amplifier. Based on no detection of an audible noise-associated event, the at least one communication processor is configured to, based on first association information between multiple driving voltages and multiple transmission powers of RF signals, identify at least one first driving voltage corresponding to at least one first transmission power of at least one first RF signal, wherein a minimum value of a driving voltage according to the first association information is a first voltage value, and the at least one communication processor is configured to control a first converter corresponding to a first power amplifier among the at least one converter, so that the at least one first driving voltage is applied to the first power amplifier corresponding to the at least one first RF signal among the at least one power amplifier, wherein a peak-to-peak value of voltage applied to a first capacitor, corresponding to the first power amplifier from among the at least one capacitor, while the at least one first driving voltage is being applied is a first value. Based on detection of the audible noise-associated event, the at least one communication processor is configured to, based on second association information between multiple driving voltages and multiple transmission powers of RF signals, identify at least one second driving voltage corresponding to the at least one first transmission power of the at least one first RF signal, wherein a minimum value of a driving voltage according to the second association information is a second voltage value greater than the first voltage value, and the at least one communication processor is further configured to control the first converter so that the at least one second driving voltage is applied to the first power amplifier, wherein a peak-to-peak value of voltage applied to the first capacitor while the at least one second driving voltage is being applied is a second value which is less than the first value.

According to various embodiments, the electronic device may further include at least one processor (e.g., at least one of the processor 120 or the processor 301) operably connected to the at least one communication processor, wherein the at least one communication processor may be further configured to receive, from the at least one processor, an indication indicating whether the audible noise-associated event has been detected, identify, based on the indication, whether the audible noise-associated event has been detected, or receive at least one piece of information for determining of whether the audible noise-associated event has been detected, and identify, based on the at least one piece of information, whether the audible noise-associated event has been detected.

According to various embodiments, the electronic device may further include a receiver (e.g., at least one of the sound output module 155 or the receiver 307) configured to output speech, and a sensor module (e.g., the sensor module 176 or the sensor module 307) including at least one sensor configured to sense whether an external object is in a specified proximity, wherein the at least one processor is configured to generate an indication indicating whether the audible noise-associated event has been detected, based on at least one of whether the receiver operates, whether the external object is in the specified proximity, identified based on sensing data from the sensor module, or whether a phone service-related application is executed, and provide the indication to the at least one communication processor.

According to various embodiments, the first association information and the second association information comprise association information based on an average power tracking (APT) mode, wherein the at least one communication processor may be configured to, based on no detection of the audible noise-associated event, identify a driving voltage of the first power amplifier, based on either the APT mode or an envelope tracking (ET) mode, and based on detection of the audible noise-associated event, the at least one communication processor may be configured to disable the ET mode, and identify, based on the APT mode, a driving voltage of the first power amplifier.

According to various embodiments, the at least one communication processor may be further configured to configure maximum transmission power levels corresponding to respective multiple physical channels, and based on detection of the multiple audible noise-associated events, the at least one communication processor may be further configured to reconfigure at least some of the maximum transmission power levels corresponding to the respective multiple physical channels, wherein at least some of the at least one first transmission power are configured based on at least some of the reconfigured maximum transmission power levels.

According to various embodiments, based on detection of the multiple audible noise-associated events, the at least one communication processor may be configured to, as at least a part of the reconfiguring of the at least some of the maximum transmission power levels corresponding to the respective multiple physical channels, identify a first maximum transmission power level of a first physical channel among the multiple physical channels, and reconfigure at least some of the maximum transmission power levels so that maximum transmission power levels of at least some of remaining physical channels other than the first physical channel have the first maximum transmission power level.

According to various embodiments, the first physical channel may be a physical uplink channel (PUSCH).

According to various embodiments, the at least one communication processor may be further configured to identify an output power, and identify first maximum power reduction (MPR) backoff based on a currently used modulation and coding scheme (MCS) level.

According to various embodiments, the at least one communication processor may be further configured to, based on no detection of the audible noise-associated event, apply the first MPR backoff to the output power to identify a maximum transmission power level associated with the at least one first RF signal, and based on detection of the audible noise-associated event, apply a second MPR backoff different from the first MPR backoff to the output power to identify a maximum transmission power level associated with the at least one first RF signal.

According to various embodiments, an operation method of an electronic device, which includes at least one communication processor configured to output at least one baseband signal, a radio frequency integrated circuit (RFIC) configured to output at least one RF signal generated based on the at least one baseband signal, at least one power amplifier configured to amplify the at least one RF signal and output amplified at least one RF signal to at least one antenna, and at least one converter comprising circuitry configured to provide the at least one power amplifier with a driving voltage for amplification of the at least one RF signal, may, based on no detection of an audible noise-associated event, include, based on first association information between multiple driving voltages and multiple transmission powers of RF signals, identifying at least one first driving voltage corresponding to at least one first transmission power of at least one first RF signal, wherein a minimum value of a driving voltage according to the first association information is a first voltage value, and controlling a first converter corresponding to a first power amplifier among the at least one converter, so that the at least one first driving voltage is applied to the first power amplifier corresponding to the at least one first RF signal among the at least one power amplifier. The method of operating the electronic device may, based on detection of the audible noise-associated event, further include, based on second association information between multiple driving voltages and multiple transmission powers of RF signals, identifying at least one second driving voltage corresponding to the at least one first transmission power of the at least one first RF signal, wherein a minimum value of a driving voltage according to the second association information is a second voltage value greater than the first voltage value, and controlling the first converter so that the at least one second driving voltage is applied to the first power amplifier.

According to various embodiments, the method of operating the electronic device may further include identifying whether the audible noise-associated event has been detected, based on an indication indicating whether the audible noise-associated event has been detected, or identifying whether the audible noise-associated event has been detected, based on at least one piece of information for determination of whether the audible noise-associated event has been detected.

According to various embodiments, the electronic device may further include a receiver configured to output speech, and a sensor module comprising at least one sensor configured to sense whether an external object is in a specified proximity, and the method of operating the electronic device may further include generating an indication indicating whether the audible noise-associated event has been detected, based on at least one of whether the receiver operates, whether the external object is in the specified proximity, identified based on sensing data from the sensor module, or whether a phone service-related application is executed.

According to various embodiments, the first association information and the second association information are association information based on an APT mode, wherein based on no detection of the audible noise-associated event, a driving voltage of the first power amplifier may be identified based on either the APT mode or an ET mode, and based on detection of the audible noise-associated event, the ET mode may be disabled, and a driving voltage of the first power amplifier may be identified based on the APT mode.

According to various embodiments, the method of operating the electronic device may further include configuring maximum transmission power levels corresponding to respective multiple physical channels, and based on detection of the multiple audible noise-associated events, reconfiguring at least some of the maximum transmission power levels corresponding to the respective multiple physical channels, wherein at least some of the at least one first transmission power are configured based on at least some of the reconfigured maximum transmission power levels.

According to various embodiments, based on detection of the multiple audible noise-associated events, the reconfiguring of the at least some of the maximum transmission power levels corresponding to the respective multiple physical channels may include identifying a first maximum transmission power level of a first physical channel among the multiple physical channels, and reconfiguring at least some of the maximum transmission power levels so that maximum transmission power levels of at least some of remaining physical channels other than the first physical channel have the first maximum transmission power level.

According to various embodiments, the first physical channel may be a PUSCH.

According to various embodiments, the method of the operating electronic device may further include identifying an output power, and identifying first MPR backoff based on a currently used MCS level.

According to various embodiments, the method of operating the electronic device may further include, based on no detection of the audible noise-associated event, applying the first MPR backoff to the output power to identify a maximum transmission power level associated with the at least one first RF signal, and based on detection of the audible noise-associated event, applying a second MPR backoff different from the first MPR backoff to the output power to identify a maximum transmission power level associated with the at least one first RF signal.

According to various embodiments, an electronic device may include at least one communication processor configured to output at least one baseband signal, a radio frequency integrated circuit (RFIC) configured to output at least one RF signal generated based on the at least one baseband signal, at least one power amplifier configured to amplify the at least one RF signal and output amplified at least one RF signal to at least one antenna, and at least one converter comprising circuitry configured to provide a driving voltage for amplifying at least one RF signal to the at least one power amplifier, wherein at least one capacitor is connected between the at least one converter and the at least one power amplifier. Based on no detection of an audible noise-associated event, the at least one communication processor may be configured to, based on a transmission power of a first RF signal being a first transmission power, control a first converter corresponding to a first power amplifier among the at least one converter, so that a first driving voltage is applied to the first power amplifier corresponding to the first RF signal among the at least one power amplifier, and the at least one communication processor may be configured to, based on the transmission power of the first RF signal being a second transmission power less than the first transmission power, control the first converter so that a second driving voltage less than the first driving voltage is applied to the first power amplifier. Based on detection of the audible noise-associated event, the at least one communication processor may be configured to, based on the transmission power of the first RF signal being the first transmission power, control the first converter so that a first driving voltage is applied to the first power amplifier, and the at least one communication processor may be further configured to, based on the transmission power of the first RF signal being the second transmission power, control the first converter so that a third driving voltage, less than the first driving voltage and greater than the second driving voltage, is applied to the first power amplifier, wherein a first voltage difference between a first voltage value, applied to a first capacitor corresponding to the first converter from among the at least one capacitor while the first driving voltage is being applied to the first power amplifier, and a second voltage value, applied to the first capacitor while the second driving voltage is being applied to the first power amplifier, is greater than a second voltage difference between the first voltage value and a third voltage value which is applied to the first capacitor while the third driving voltage is being applied to the first power amplifier.

According to various embodiments, an electronic device may include at least one communication processor configured to output at least one baseband signal, a radio frequency integrated circuit (RFIC) configured to output at least one RF signal generated based on the at least one baseband signal, at least one power amplifier configured to amplify the at least one RF signal and output amplified at least one RF signal to at least one antenna, and at least one converter comprising circuitry configured to provide a driving voltage for amplifying the at least one RF signal to the at least one power amplifier. The at least one communication processor may be configured to, based on no detection of an audible noise-associated event, configure a maximum transmission power level corresponding to a first RF signal to be a first value, and control a first converter corresponding to a first power amplifier among the at least one power amplifier, so that a first driving voltage identified based on the first value is applied to the first power amplifier corresponding to the first RF signal among the at least one power amplifier. The at least one communication processor may be further configured to, based on detection of the audible noise-associated event, configure a maximum transmission power level corresponding to the first RF signal to be a second value less than the first value, and control the first converter so that a second driving voltage identified based on the second value is applied to the first power amplifier, wherein the second driving voltage is less than the first driving voltage.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various embodiments are intended to be illustrative, not limiting. It will be understood by those skilled in the art that various changes in form and detail may be made without departing from the spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   at least one communication processor configured to output at least one baseband signal;
   a radio frequency integrated circuit (RFIC) configured to output at least one RF signal generated based on the at least one baseband signal;
   at least one power amplifier configured to amplify the at least one RF signal and output amplified at least one RF signal to at least one antenna; and
   at least one converter configured to provide a driving voltage for amplifying the at least one RF signal to the at least one power amplifier, wherein at least one capacitor is connected between the at least one converter and the at least one power amplifier,
   wherein the at least one communication processor is configured to, based on no detection of an audible noise-associated event:
   based on first association information between multiple driving voltages and multiple transmission powers of RF signals, identify at least one first driving voltage corresponding to at least one first transmission power of at least one first RF signal, wherein a minimum value of a driving voltage according to the first association information is a first voltage value, and
   control a first converter corresponding to a first power amplifier among the at least one converter, so that the at least one first driving voltage is applied to the first power amplifier corresponding to the at least one power amplifier, wherein a peak-to-peak value of voltage applied to a first capacitor corresponding to the first power amplifier from among the at least one capacitor, while the at least one first driving voltage is applied is a first value,
   based on detection of the audible noise-associated event:
   based on second association information between multiple driving voltages and multiple transmission powers of RF signals, identify at least one second driving voltage corresponding to the at least one first transmission power of the at least one first RF signal, wherein a minimum value of a driving voltage according to the second association information is a second voltage value greater than the first voltage value, and
   control the first converter so that the at least one second driving voltage is applied to the first power amplifier, wherein a peak-to-peak value of voltage applied to the first capacitor while the at least one second driving voltage is being applied is a second value less than the first value.

2. The electronic device of claim 1, further comprising at least one processor operably connected to the at least one communication processor,
   wherein the at least one communication processor is further configured to,
   receive, from the at least one processor, an indication indicating whether the audible noise-associated event has been detected, and identify, based on the indication, whether the audible noise-associated event has been detected, or
   receive at least one piece of information for determining of whether the audible noise-associated event has been detected, and identify, based on the at least one piece of information, whether the audible noise-associated event has been detected.

3. The electronic device of claim 1, further comprising:
   a receiver configured to output speech; and
   a sensor module comprising at least one sensor configured to sense whether an external object is in proximity,
   wherein the at least one processor is configured to:
   generate an indication indicating whether the audible noise-associated event has been detected, based on at least one of whether the receiver operates, whether the external object is in a specified proximity, identified based on sensing data from the sensor module, or whether a phone service-related application is executed, and
   provide the indication to the at least one communication processor.

4. The electronic device of claim 1, wherein the first association information and the second association information are association information based on an average power tracking (APT) mode, and
   wherein the at least one communication processor is configured to, based on no detection of the audible noise-associated event, identify a driving voltage of the first power amplifier, based on either the APT mode or an envelope tracking (ET) mode, and based on detection of the audible noise-associated event, disable the ET mode and identify, based on the APT mode, a driving voltage of the first power amplifier.

5. The electronic device of claim 1, wherein the at least one communication processor is further configured to,
   configure maximum transmission power levels corresponding to respective multiple physical channels,
   based on detection of the multiple audible noise-associated events, reconfigure at least some of the maximum transmission power levels corresponding to the respective multiple physical channels, and wherein at least some of the at least one first transmission power are configured based on at least some of the reconfigured maximum transmission power levels.

6. The electronic device of claim 5, wherein, based on detection of the multiple audible noise-associated events, as at least a part of the reconfiguring of the at least some of the maximum transmission power levels corresponding to the respective multiple physical channels, the at least one communication processor is configured to,
identify a first maximum transmission power level of a first physical channel among the multiple physical channels, and
reconfigure at least some of the maximum transmission power levels so that maximum transmission power levels of at least some of remaining physical channels other than the first physical channel have the first maximum transmission power level.

7. The electronic device of claim 6, wherein the first physical channel is a physical uplink channel (PUSCH).

8. The electronic device of claim 1, wherein the at least one communication processor is further configured to,
identify an output power, and
identify first maximum power reduction (MPR) backoff, based on a currently used modulation and coding scheme (MCS) level.

9. The electronic device of claim 8, wherein the at least one communication processor is further configured to,
based on no detection of the audible noise-associated event, apply the first MPR backoff to the output power to identify a maximum transmission power level associated with the at least one first RF signal, and
based on detection of the audible noise-associated event, apply a second MPR backoff different from the first MPR backoff to the output power to identify a maximum transmission power level associated with the at least one first RF signal.

10. A method of operating an electronic device comprising at least one communication processor configured to output at least one baseband signal, a radio frequency integrated circuit (RFIC) configured to output at least one RF signal generated based on the at least one baseband signal, at least one power amplifier configured to amplify the at least one RF signal and output amplified at least one RF signal to at least one antenna, and at least one converter configured to provide the at least one power amplifier with a driving voltage for amplification of the at least one RF signal, the method comprising,
based on no detection of an audible noise-associated event:
based on first association information between multiple driving voltages and multiple transmission powers of RF signals, identifying at least one first driving voltage corresponding to at least one first transmission power of at least one first RF signal, wherein a minimum value of a driving voltage according to the first association information is a first voltage value, and
controlling a first converter corresponding to a first power amplifier among the at least one converter, so that the at least one first driving voltage is applied to the first power amplifier corresponding to the at least one first RF signal among the at least one power amplifier,
based on detection of the audible noise-associated event:
based on second association information between multiple driving voltages and multiple transmission powers of RF signals, identifying at least one second driving voltage corresponding to the at least one first transmission power of the at least one first RF signal, wherein a minimum value of a driving voltage according to the second association information is a second voltage value greater than the first voltage value, and
controlling the first converter so that the at least one second driving voltage is applied to the first power amplifier.

11. The method of claim 10, further comprising, identifying whether the audible noise-associated event has been detected, based on an indication indicating whether the audible noise-associated event has been detected, or identifying whether the audible noise-associated event has been detected, based on at least one piece of information for determination of whether the audible noise-associated event has been detected.

12. The method of claim 10, wherein the electronic device further comprises a receiver configured to output speech, and a sensor module configured to sense whether an external object is in a specified proximity, and
wherein the method of the electronic device further comprises,
generating an indication indicating whether the audible noise-associated event has been detected, based on at least one of whether the receiver operates, whether the external object is in a specified proximity, identified based on sensing data from the sensor module, or whether a phone service-related application is executed.

13. The method of claim 10, wherein the first association information and the second association information are association information based on an average power tracking (APT) mode, and
based on no detection of the audible noise-associated event, a driving voltage of the first power amplifier is identified based on either the APT mode or an envelope tracking (ET) mode, and based on detection of the audible noise-associated event, the ET mode is disabled, and a driving voltage of the first power amplifier is identified based on the APT mode.

14. The method of claim 10, further comprising:
configuring maximum transmission power levels corresponding to respective multiple physical channels; and
based on detection of the multiple audible noise-associated events, reconfiguring at least some of the maximum transmission power levels corresponding to the respective multiple physical channels,
wherein at least some of the at least one first transmission power are configured based on at least some of the reconfigured maximum transmission power levels.

15. The method of claim 14, wherein the reconfiguring of the at least some of the maximum transmission power levels corresponding to the respective multiple physical channels, based on detection of the multiple audible noise-associated events comprises:
identifying a first maximum transmission power level of a first physical channel among the multiple physical channels; and
reconfiguring at least some of the maximum transmission power levels so that maximum transmission power levels of at least some of remaining physical channels other than the first physical channel have the first maximum transmission power level.

16. The method of claim 15, wherein the first physical channel is a physical uplink channel (PUSCH).

17. The method of claim 10, further comprising:
identifying an output power; and identifying first maximum power reduction (MPR) backoff, based on a currently used modulation and coding scheme (MCS) level.

18. The method of claim 17, further comprising:

based on no detection of the audible noise-associated event, applying the first MPR backoff to the output power to identify a maximum transmission power level associated with the at least one first RF signal; and based on detection of the audible noise-associated event, applying a second MPR backoff different from the first MPR backoff to the output power to identify a maximum transmission power level associated with the at least one first RF signal.

19. An electronic device comprising:

at least one communication processor configured to output at least one baseband signal;

a radio frequency integrated circuit (RFIC) configured to output at least one RF signal generated based on the at least one baseband signal;

at least one power amplifier configured to amplify the at least one RF signal and output amplified at least one RF signal to at least one antenna; and at least one converter configured to provide a driving voltage for amplifying the at least one RF signal to the at least one power amplifier, wherein at least one capacitor is connected between the at least one converter and the at least one power amplifier, wherein the at least one communication processor is configured to, based on no detection of an audible noise-associated event:

based on a transmission power of a first RF signal being a first transmission power, control a first converter corresponding to a first power amplifier among the at least one converter, so that a first driving voltage is applied to the first power amplifier corresponding to the first RF signal among the at least one power amplifier, and based on the transmission power of the first RF signal being a second transmission power less than the first transmission power, control the first converter so that a second driving voltage less than the first driving voltage is applied to the first power amplifier, based on detection of the audible noise-associated event:

based on the transmission power of the first RF signal being the first transmission power, control the first converter so that a first driving voltage is applied to the first power amplifier, and based on the transmission power of the first RF signal being the second transmission power, control the first converter so that a third driving voltage, less than the first driving voltage and greater than the second driving voltage, is applied to the first power amplifier, and wherein a first voltage difference between a first voltage value, applied to a first capacitor corresponding to the first converter from among the at least one capacitor while the first driving voltage is being applied to the first power amplifier, and a second voltage value, applied to the first capacitor while the second driving voltage is being applied to the first power amplifier, is greater than a second voltage difference between the first voltage value and a third voltage value applied to the first capacitor while the third driving voltage is being applied to the first power amplifier.

20. An electronic device comprising:

at least one communication processor configured to output at least one baseband signal;

a radio frequency integrated circuit (RFIC) configured to output at least one RF signal generated based on the at least one baseband signal;

at least one power amplifier configured to amplify the at least one RF signal and output amplified at least one RF signal to at least one antenna; and at least one converter configured to provide a driving voltage for amplifying the at least one RF signal to the at least one power amplifier, wherein the at least one communication processor is configured to, based on no detection of an audible noise-associated event:

configure a maximum transmission power level corresponding to a first RF signal to be a first value, and control a first converter corresponding to a first power amplifier among the at least one power amplifier, so that a first driving voltage identified based on the first value is applied to the first power amplifier corresponding to the first RF signal among the at least one power amplifier, based on detection of the audible noise-associated event:

configure a maximum transmission power level corresponding to the first RF signal to be a second value less than the first value, and control the first converter so that a second driving voltage identified based on the second value is applied to the first power amplifier, and wherein the second driving voltage is less than the first driving voltage.

* * * * *